US011470525B2

(12) United States Patent
Jung et al.

(10) Patent No.: US 11,470,525 B2
(45) Date of Patent: Oct. 11, 2022

(54) METHOD AND APPARATUS FOR HANDLING CELL RESELECTION PRIORITIES FOR SUPPORTING V2X COMMUNICATION IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 16/828,566

(22) Filed: Mar. 24, 2020

(65) Prior Publication Data
US 2020/0314713 A1 Oct. 1, 2020

(30) Foreign Application Priority Data

Mar. 25, 2019 (KR) .................. 10-2019-0033549
Aug. 2, 2019 (KR) .................. 10-2019-0094559

(51) Int. Cl.
H04W 36/08 (2009.01)
H04W 76/27 (2018.01)
(Continued)

(52) U.S. Cl.
CPC ............ H04W 36/08 (2013.01); H04W 4/40 (2018.02); H04W 4/46 (2018.02); H04W 36/0072 (2013.01); H04W 76/27 (2018.02)

(58) Field of Classification Search
CPC ..... H04W 4/40; H04W 4/46; H04W 72/0453; H04W 36/00; H04W 36/14; H04W 48/18;
(Continued)

(56) References Cited

U.S. PATENT DOCUMENTS

2018/0084407 A1 3/2018 Jung et al.
2018/0199521 A1 7/2018 Balseiro
(Continued)

OTHER PUBLICATIONS

Huawei et al., Cell reselection for NR SL communication, R2-1902052, 3GPP TSG-RAN WG2 Meeting#105, Athens, Greece, Feb. 15, 2019, section 2; and figure 1.
(Continued)

Primary Examiner — Nam T Huynh
(74) Attorney, Agent, or Firm — Jefferson IP Law, LLP

(57) ABSTRACT

A communication technique for convergence of a $5^{th}$ generation (5G) communication system is provided, for supporting a higher data transmission rate beyond that supported by a $4^{th}$ generation (4G) system, with internet of things (IoT) technology, and a system therefor. The disclosure may be applied to an intelligent service (for example, a smart home, smart building, smart city, smart car or connected car, health care, digital education, retail business, security and safety-related service, etc.), based on 5G communication technology and IoT-related technology. A method and an apparatus for handling cell reselection and frequency priorities for vehicle to everything sidelink (V2X SL) communication of a user equipment (UE) are provided.

18 Claims, 9 Drawing Sheets

(51) Int. Cl.
*H04W 36/00* (2009.01)
*H04W 4/40* (2018.01)
*H04W 4/46* (2018.01)

(58) Field of Classification Search
CPC . H04W 36/08; H04W 36/0072; H04W 76/27; H04W 8/22; H04W 48/12; H04W 76/23; H04W 4/70; H04W 48/20
See application file for complete search history.

(56) References Cited

U.S. PATENT DOCUMENTS

2020/0178290 A1* 6/2020 Lee .................... H04W 72/1289
2021/0076321 A1* 3/2021 Kim ...................... H04W 48/20

OTHER PUBLICATIONS

3GPP; TSG RAN; NR; User Equipment (UE) procedures in Idle mode and RRC Inactive state (Release 15), 3GPP TS 38.304 V15.2.0 (Dec. 2018), Jan. 14, 2019, section 5.2.6.
Ericsson, Cell reselection for NR V2X, R2-1901660, 3GPP TSG-RAN WG2 #105, Athens, Greece, Feb. 14, 2019, sections 2-3.
LG Electronics Inc., Correction on going to RRC_IDLE upon inter-RAT cell reselection in RRC_INACTIVE, R2-1902139, 3GPP TSG-RAN2 Meeting #105, Athens, Greece, Feb. 15, 2019, section 5.3.11.
International Search Report dated Jul. 2, 2020, issued in International Application No. PCT/KR2020/003986.
Extended European Search Report dated Mar. 21, 2022, issued in a counterpart European Application No. 20777989.3.
Interdigital Inc: "TP to TR 38.885 on MultiRAT CP Aspects in V2X V2X", GPP Draft; R2-1901577 (R16 V2X SI AI1421 CP Multirat Aspects), 3rd Generation Partnership Project (3GPP), Mobile Competence Centre; 650, Route Des Lucioles; F-06921 Sophia-Antipolis Cedex; France vol. RAN WG2, No. XP051602932; Feb. 15, 2019, Athens, Greece.
Huawei (Rapporteur): "Summary of [103bis#37] [NR/V2X]—NR Sidelink Design, CP Aspects", 3GPP Draft; R2-1816515 Summary of [103BIS#37] [NR V2X]—NR Sidelink Design, CP Aspects, 3rd Generation Partnership Project (3GPP), Mobile Competence Centre; 650, Route Des Lucioles; F-06921 Sophia-A vol. RAN WG2, No. Spokane, USA; Nov. 12, 2018, XP051556093.

* cited by examiner

METHOD AND APPARATUS FOR HANDLING CELL RESELECTION PRIORITIES FOR SUPPORTING V2X COMMUNICATION IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2019-0033549, filed on Mar. 25, 2019, in the Korean Intellectual Property Office, and of a Korean patent application number 10-2019-0094559, filed on Aug. 2, 2019, in the Korean Intellectual Property Office, the disclosure of each of which is incorporated by reference herein in its entirety.

BACKGROUND

1. Field

The disclosure relates to a method and an apparatus for handling cell reselection and frequency priorities for vehicle to everything sidelink (V2X SL) communication of a user equipment (UE).

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift key (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In next-generation mobile communication new radio (NR), V2X SL communication may be designed to provide not only basic safety services but also various enhanced services. Therefore, NR V2X SL communication may be designed to support not only a broadcast transmission type but also unicast and/or groupcast transmission types.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for handling cell reselection and frequency priorities for vehicle to everything sidelink (V2X SL) communication of a user equipment (UE) in a radio resource control (RRC) inactive mode.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes identifying a configuration for performing both a new radio (NR) sidelink communication and a V2X sidelink communication, identifying at least one frequency for a cell selection and reselection, based on the terminal being not a radio resource control (RRC) connected state, and determining a first frequency of the at least one frequency to be a highest priority for the cell selection and reselection, in a case that the first frequency provides both a NR sidelink communication configuration and a V2X sidelink communication configuration.

In accordance with another aspect of the disclosure, a terminal in a wireless communication system is provided. The terminal includes a transceiver and at least one processor configured to, identify a configuration for performing both a new radio (NR) sidelink communication and a V2X sidelink communication, identify at least one frequency for a cell selection and reselection, based on the terminal being not a radio resource control (RRC) connected state, and determine a first frequency of the at least one frequency to be a highest priority for the cell selection and reselection, in a case that the first frequency provides both a NR sidelink communication configuration and a V2X sidelink communication configuration.

According to an embodiment of the disclosure, a UE in an RRC inactive mode is allowed to reselect a cell and to handle frequency priorities, thereby supporting V2X SL communication for providing various enhanced services.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
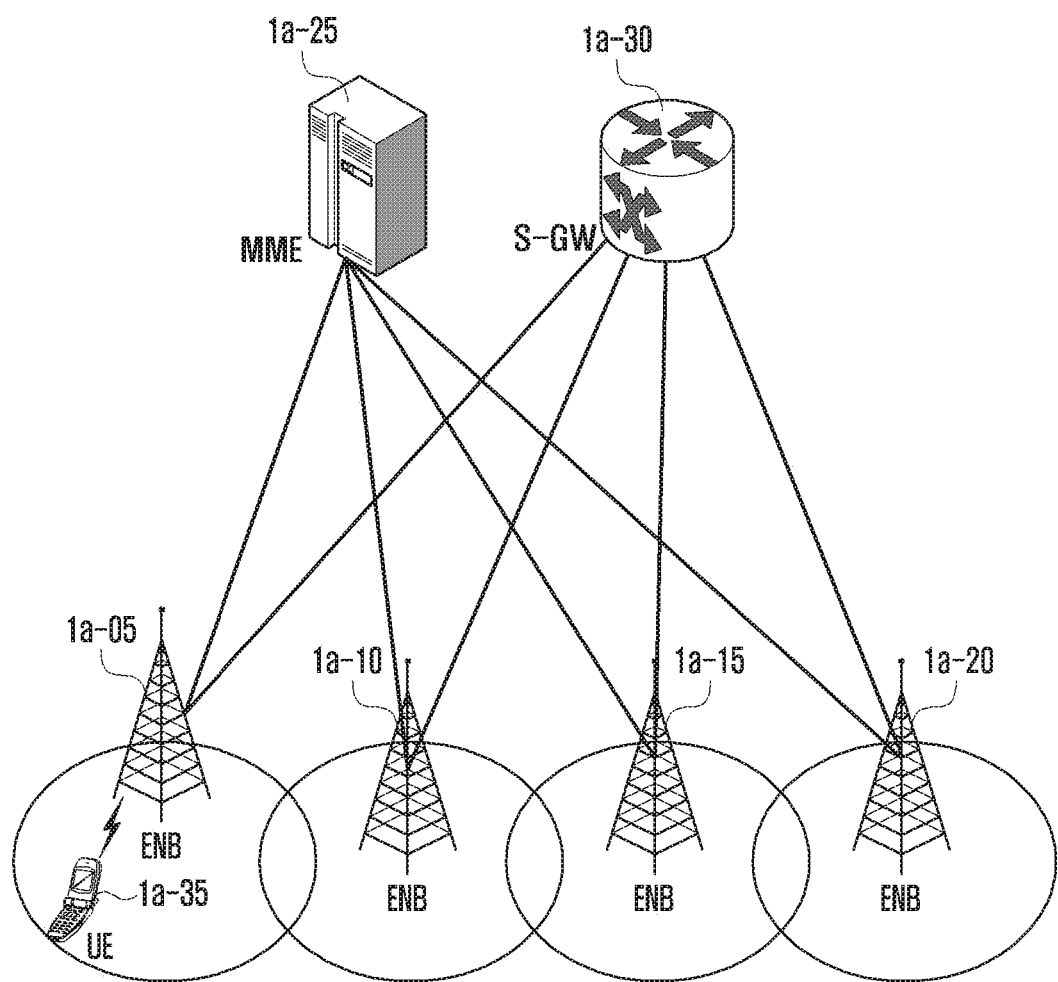
FIG. 1 illustrates a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

FIG. 1 illustrates a structure of an LTE system according to an embodiment of the disclosure.

Referring to FIG. 1, a radio access network of the LTE system may include an evolved node B (hereinafter, referred to as an eNB, a Node B, or a base station) 1a-05, 1a-10, 1a-15, or 1a-20, a mobility management entity (MME) 1a-25, and a serving gateway (S-GW) 1a-30. A user equipment (hereinafter, referred to as a UE or terminal) 1a-35 may access an external network through the eNBs 1a-05 to 1a-20 and the S-GW 1a-30.

Referring to FIG. 1, the eNBs 1a-05 to 1a-20 correspond to existing Node Bs of a universal mobile telecommunication system (UMTS). The eNBs may be connected to the UE 1a-35 over a wireless channel, and may perform a more complex role than that of the existing Node Bs. In the LTE system, all user traffic based on real-time service, such as a voice over Internet protocol (VoIP) service, is provided through a shared channel Therefore, a device that collects state information, such as UEs' buffer status, available transmission power state, and channel state, and performs scheduling is required. The eNBs 1a-05 to 1a-20 may be responsible for these functions.

One eNB may generally control a plurality of cells. For example, in order to realize a transmission speed of 100 Mbps, the LTE system may use orthogonal frequency-division multiplexing (OFDM) as a radio access technology, for example, at a bandwidth of 20 MHz. In addition, the LTE system may apply adaptive modulation & coding (AMC), which determines a modulation scheme and a channel coding rate according to the channel state of a UE. The S-GW 1a-30 is a device that provides a data bearer, and may generate or remove a data bearer under the control of the MME 1a-25. The MME is a device that performs not only a mobility management function for the UE but also various control functions, and may be connected to a plurality of base stations.

Figure 2:
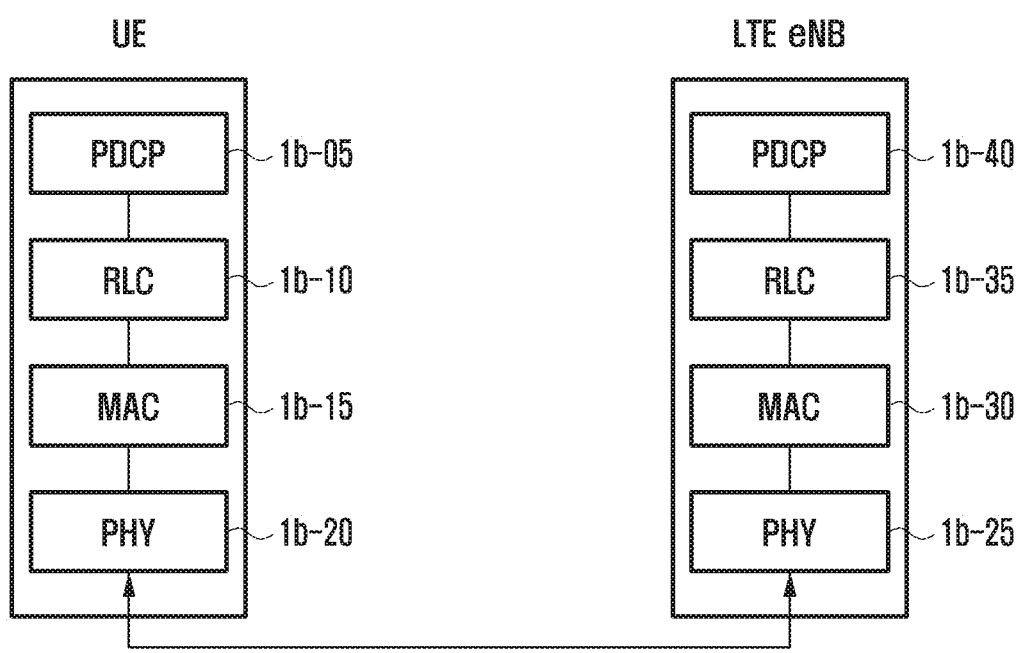
FIG. 2 illustrates a wireless protocol structure of an LTE system according to an embodiment of the disclosure.

FIG. 2 illustrates a wireless protocol structure of an LTE system according to an embodiment of the disclosure.

Referring to FIG. 2, a wireless protocol of the LTE system may include packet data convergence protocols (PDCPs) 1b-05 and 1b-40, radio link controls (RLCs) 1b-10 and 1b-35, and media access controls (MACs) 1b-15 and 1b-30 respectively at a UE and an eNB. The PDCPs may be responsible for IP header compression/decompression or the like. The main functions of the PDCPs may be summarized as follows.

Header compression and decompression (ROHC only)
    Transfer of user data
    In-sequence delivery of upper-layer packet data units (PDUs) at PDCP re-establishment procedure for RLC AM
    For split bearers in DC (only support for RLC AM): PDCP PDU routing for transmission and PDCP PDU reordering for reception
    Duplicate detection of lower-layer service data units (SDUs) at PDCP re-establishment procedure for RLC AM
    Retransmission of PDCP SDUs at handover and, for split bearers in DC, of PDCP PDUs at PDCP data-recovery procedure, for radio link control acknowledge mode (RLC AM)
    Ciphering and deciphering
    Timer-based SDU discard in uplink The RLCs 1b-10 and 1b-35 may reconstruct a PDCP PDU to have an appropriate size, and may perform an automatic repeat request (ARQ) operation. The main functions of the RLCs may be summarized as follows.

Transfer of upper-layer PDUs
    Error Correction through automatic repeat request (ARQ) (only for AM data transfer)
    Concatenation, segmentation, and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MACs 1b-15 and 1b-30 may be connected to a plurality of RLC-layer devices configured in one UE, may multiplex RLC PDUs into a MAC PDU, and may demultiplex a MAC PDU into RLC PDUs. The main functions of the MACs may be summarized as follows.

Mapping between logical channels and transport channels
    Multiplexing/demultiplexing of MAC SDUs belonging to one or different logical channels into/from Transport Blocks (TBs) delivered to/from the physical layer on transport channels
    Scheduling information reporting
    Error correction through HARQ
    Priority handling between logical channels of one UE
    Priority handling between UEs by means of dynamic scheduling
    MBMS service identification
    Transport format selection
    Padding Physical (PHY) layers 1b-20 and 1b-25 may perform channel coding and modulation of upper-layer data, and may convert the data into OFDM symbols to transmit the OFDM symbols via a wireless channel, or may demodulate OFDM symbols received via a wireless channel and may perform channel decoding of the OFDM symbols to deliver the OFDM symbols to an upper layer.

Figure 3:
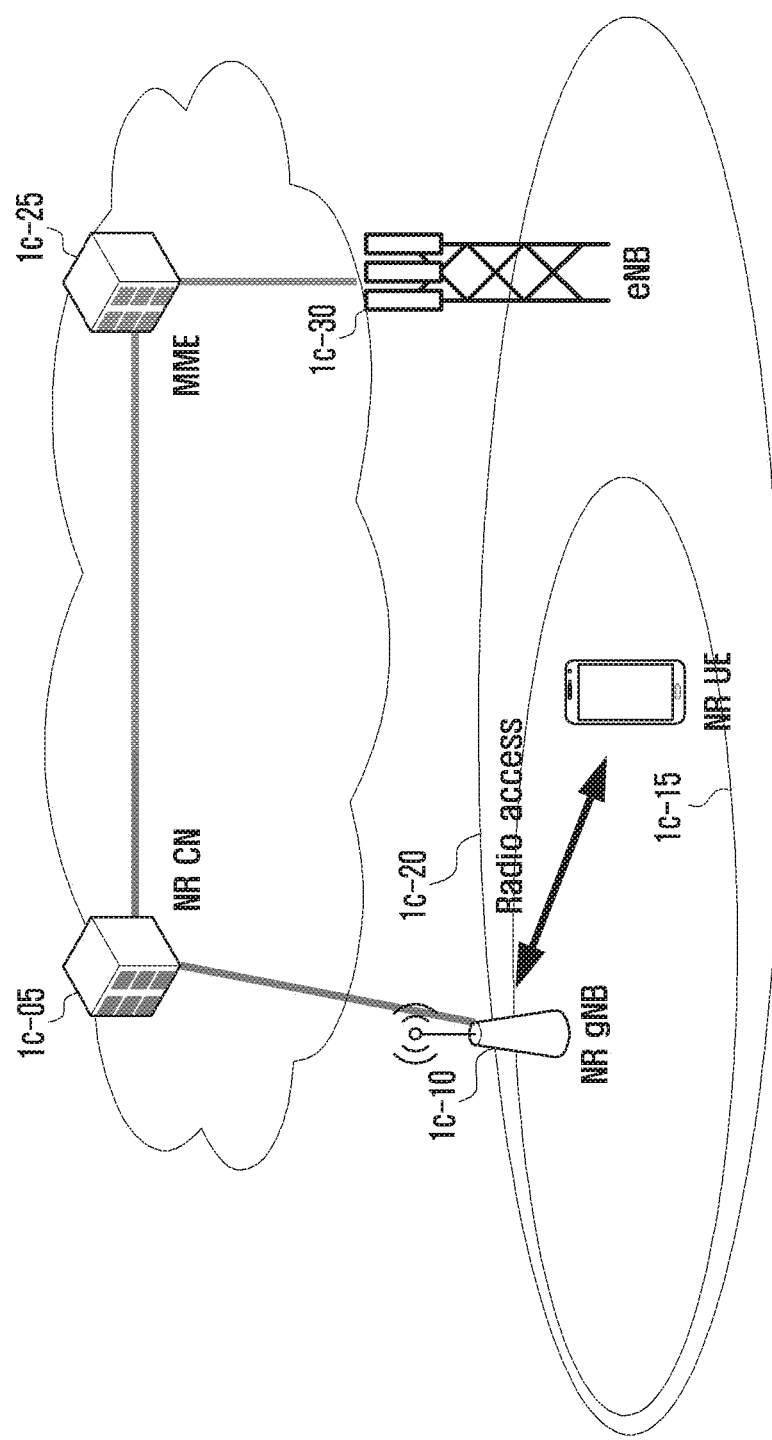
FIG. 3 illustrates a structure of a next-generation mobile communication system according to an embodiment of the disclosure.

FIG. 3 illustrates a structure of a next-generation mobile communication system according to an embodiment of the disclosure.

Referring to FIG. 3, a radio access network of the next-generation mobile communication system (hereinafter, referred to as NR or 5G) may include a new radio node B (hereinafter, an NR gNB, or NR base station) 1c-10 and a new radio core network (NR CN) 1c-05. A new radio user equipment (hereinafter, an NR UE or terminal) 1c-15 may access an external network 1c-20 through the NR gNB 1c-10 and the NR CN 1c-05.

Referring to FIG. 3, the NR gNB 1c-10 may correspond to an evolved node B (eNB) of an existing LTE system. The NR gNB is connected to the NR UE 1c-15 over a wireless channel, and may provide a more advanced service than that of the existing eNB. In the next-generation mobile communication system, all user traffic may be served through a shared channel Therefore, a device that collects state information, such as UEs' buffer status, available transmission power state, and channel state, and performs scheduling is required. The NR gNB 1c-10 may be responsible for these functions. One NR gNB may generally control a plurality of cells. The next-generation mobile communication system may apply a bandwidth greater than the existing maximum bandwidth in order to realize ultrahigh-speed data transmission compared to current LTE. Further, the next-generation mobile communication system may employ a beamforming technique in addition to OFDM as a radio access technology. In addition, the next-generation mobile communication system may apply AMC, which determines a modulation scheme and a channel coding rate according to the channel state of a UE.

The NR CN 1c-05 may perform functions of mobility support, bearer setup, and QoS setup. The NR CN is a device that performs not only a mobility management function for a UE but also various control functions, and may be connected to a plurality of base stations. The next-generation mobile communication system may also interwork with the existing LTE system, in which case the NR CN may be connected to an MME 1c-25 through a network interface. The MME is connected to the eNB 1c-30, which is an existing base station.

Figure 4:
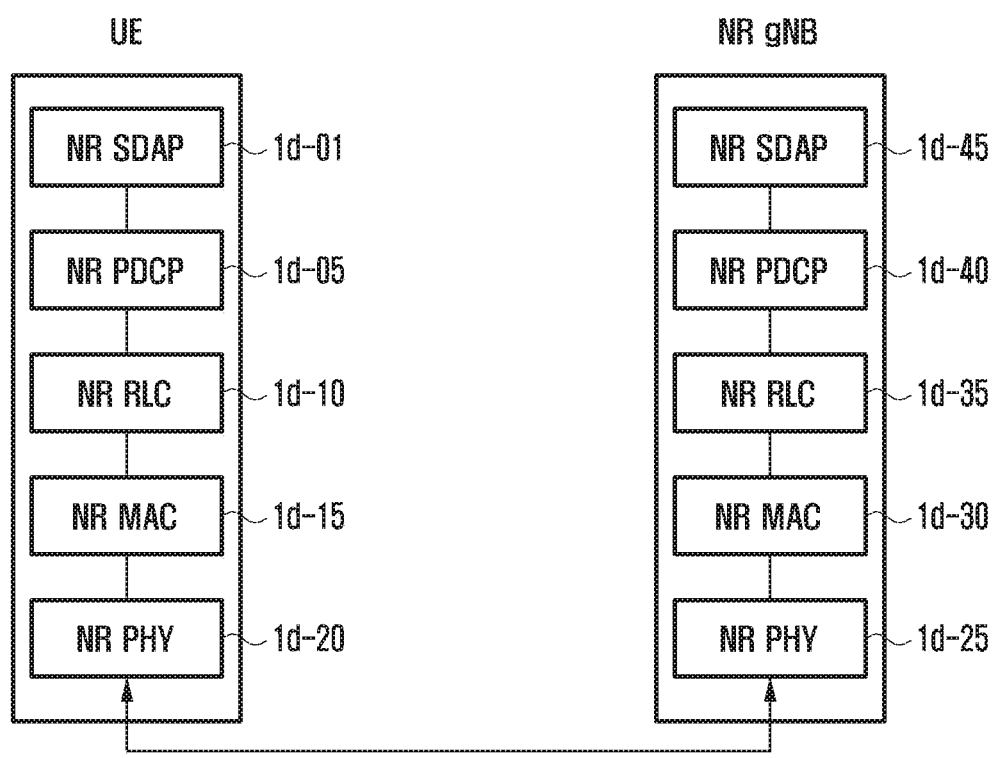
FIG. 4 illustrates a wireless protocol structure of a next-generation mobile communication system according to an embodiment of the disclosure.

FIG. 4 illustrates a wireless protocol structure of a next-generation mobile communication system according to an embodiment of the disclosure.

Referring to FIG. 4, a wireless protocol of the next-generation mobile communication system includes NR service data adaptation protocols (SDAPs) 1d-01 and 1d-45, NR PDCPs 1d-05 and 1d-40, NR RLCs 1d-10 and 1d-35, NR MACs 1d-15 and 1d-30, and NR PHYs 1d-20 and 1d-25 respectively at a UE and an NR base station.

The main functions of the NR SDAPs 1d-01 and 1d-45 may include some of the following functions.

Transfer of user-plane data
    Mapping between quality of service (QoS) flow and data radio bearer (DRB) for both downlink (DL) and uplink (UL)
    Marking QoS flow identification (ID) in both DL and UL packets
    Reflective QoS flow-to-DRB mapping for UL SDAP PDUs Regarding the SDAP-layer devices, the UE may receive a configuration about whether to use a header of the SDAP-layer devices or whether to use a function of the SDAP-layer devices for each PDCP-layer device, each bearer, or each logical channel via a radio resource control (RRC) message. When an SDAP header is configured, a one-bit non-access stratum (NAS) quality of service (QoS) reflective indicator (NAS reflective QoS) and a one-bit AS QoS reflective indicator (AS reflective QoS) of the SDAP header may be used for indication to enable the UE to update or reconfigure uplink and downlink QoS flows and mapping information for a data bearer. The SDAP header may include QoS flow ID information indicating QoS. The QoS information may be used as a data-processing priority, scheduling information, or the like in order to support a desired service.

The main functions of the NR PDCPs 1d-05 and 1d-40 may include some of the following functions.

Header compression and decompression (ROHC only)
Transfer of user data
In-sequence delivery of upper-layer PDUs
Out-of-sequence delivery of upper-layer PDUs
PDCP PDU reordering for reception
Duplicate detection of lower-layer SDUs
Retransmission of PDCP SDUs
Ciphering and deciphering
Timer-based SDU discard in uplink.

Among the above functions, the reordering function of the NR PDCP devices refers to a function of rearranging PDCP PDUs received in a lower layer in sequence based on the PDCP sequence number (SN). The reordering function of the NR PDCP devices may include a function of transmitting the data to an upper layer in the rearranged order or a function of immediately transmitting the data regardless of order. In addition, the reordering function may include a function of recording lost PDCP PDUs via reordering, may include a function of reporting the state of lost PDCP PDUs to a transmitter, and may include a function of requesting retransmission of lost PDCP PDUs.

The main functions of the NR RLCs 1d-10 and 1d-35 may include some of the following functions.

Transfer of upper-layer PDUs
In-sequence delivery of upper-layer PDUs
Out-of-sequence delivery of upper-layer PDUs
Error Correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment Among the above functions, the in-sequence delivery function of the NR RLC devices refers to a function of delivering RLC SDUs received from a lower layer to an upper layer in order. The in-sequence delivery function of the NR RLC devices may include a function of reassembling and delivering a plurality of RLC SDUs when one original RLC SDU which is divided into the plurality of RLC SDUs is received.

The in-sequence delivery function of the NR RLC devices may include a function of rearranging received RLC PDUs based on the RLC SN or the PDCP SN, may include a function of recording lost RLC PDUs via reordering, may include a function of reporting the state of lost RLC PDUs to a transmitter, and may include a function of requesting retransmission of lost RLC PDUs.

If there is a lost RLC SDU, the in-sequence delivery function of the NR RLC devices 1d-10 and 1d-35 may include a function of delivering only RLC SDUs before the lost RLC SDU to an upper layer in order. Further, the in-sequence delivery function of the NR RLC devices may include a function of delivering all RLC SDUs received before a timer starts to an upper layer in order when the timer has expired despite the presence of a lost RLC SDU. Further, the in-sequence delivery function of the NR RLC devices may include a function of delivering all RLC SDUs received up to that point in time to an upper layer in order when the timer expires despite the presence of a lost RLC SDU.

The NR RLC devices 1d-10 and 1d-35 may process RLC PDUs in the order of reception thereof regardless of the order of SNs, and may deliver the RLC PDUs to the NR PDCP devices 1d-05 and 1d-40 in an out-of-sequence manner.

When receiving a segment, the NR RLC devices 1d-10 and 1d-35 may receive segments that are stored in a buffer or are to be subsequently received, may reconstruct the segments into one whole RLC PDU, and may deliver the RLC PDU to the NR PDCP devices.

The NR RLC layers may not include a concatenation function, and the concatenation function may be performed in the NR MAC layers, or may be replaced with a multiplexing function of the NR MAC layers.

The out-of-sequence delivery function of the NR RLC devices refers to a function of delivering RLC SDUs received from a lower layer directly to an upper layer regardless of order. The out-of-sequence delivery function of the NR RLC devices may include a function of reassembling and delivering a plurality of RLC SDUs when one original RLC SDU is divided into the plurality of RLC SDUs to be received. In addition, the out-of-sequence delivery function of the NR RLC devices may include a function of recording lost RLC PDUs by storing and reordering the RLC SNs or PDCP SNs of received RLC PDUs.

The NR MACs 1d-15 and 1d-30 may be connected to a plurality of NR RLC-layer devices configured in one device, and the main functions of the NR MACs may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1d-20 and 1d-25 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Figure 5:
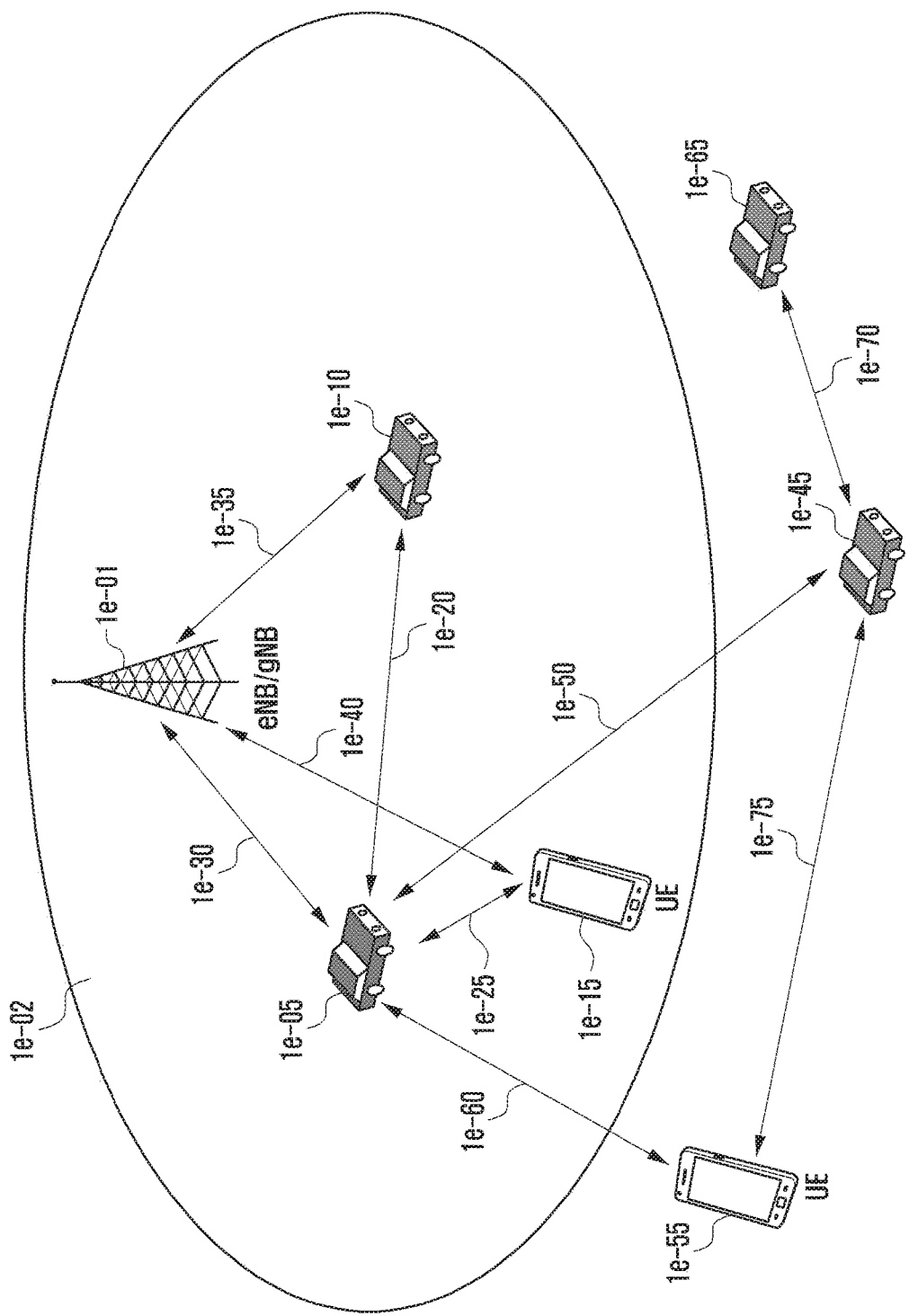
FIG. 5 illustrates vehicle to everything (V2X) communication in a next-generation mobile communication system according to an embodiment of the disclosure.

FIG. 5 illustrates V2X communication in a next-generation mobile communication system according to an embodiment of the disclosure.

Referring to FIG. 5, vehicle-to-everything (V2X) according to the embodiment collectively refers to communication technology based on a vehicle and all interfaces and may be vehicle-to-vehicle (V2V), vehicle-to-infrastructure (V2I), vehicle-to-pedestrian (V2P), vehicle-to-network (V2N), and the like according to the form and components for establishing communication.

Referring to FIG. 5, a base station 1e-01 may include at least one vehicle terminal 1e-05 or 1e-10 and a portable pedestrian UE 1e-15 located in a cell 1e-02 supporting V2X.

Here, V2X may be supported through a Uu interface and/or a PC5 interface. When V2X is supported through the Uu interface, for example, the vehicle terminal 1e-05 or 1e-10 may perform V2X cellular communication with the base station 1e-01 using a vehicle-terminal/base-station uplink (UL)/downlink (DL) 1e-30 or 1e-35, or the portable pedestrian UE 1e-15 may perform V2X cellular communication using a portable-pedestrian-UE/base-station uplink (UL)/downlink (DL) 1e-40. When V2X is supported through the PC5 interface, V2X sidelink (SL) communication may be performed using a UE-UE sidelink (SL) 1e-20 and 1e-25. For example, the vehicle terminal 1e-05 in the coverage area of the base station terrestrial radio access (E-UTRA/NR) may transmit and receive V2X packets to and from other vehicle terminals 1e-10 and 1e-40 and/or portable pedestrian UEs 1e-15 and 1e-55 through SLs 1e-20, 1e-50, 1e-25, and 1e-60 as transmission channels. The V2X packets may be transmitted and received in a broadcast transmission type and/or a unicast and/or groupcast transmission type.

A UE supporting V2X sidelink communication may transmit and receive a V2X packet according to a resource allocation mode (scheduled resource allocation or UE autonomous resource selection). Scheduled resource allocation (mode 1 and/or mode 3) is a mode in which a base station allocates a resource used for sidelink transmission to a UE in an RRC-connected mode based on a dedicated scheduling scheme. This mode enables the base station to manage sidelink resources, and may thus be efficient for interference management and/or management of a resource pool (dynamic allocation and semi-persistent transmission). When there is data to be transmitted to other UE(s), the UE in the RRC-connected mode may report that there is data to be transmitted to other UE(s) to the base station using an RRC message or a MAC control element (hereinafter, "CE"). For example, the RRC message may be a SidelinkUEInformation or UEAssistanceInformation message, and the MAC CE may be a buffer status report MAC CE in a new format (including at least an indicator indicating that a buffer status report is for V2X communication and information about the size of data buffered for sidelink communication).

UE autonomous resource selection (mode 2 and/or mode 4) is a mode in which a base station provides sidelink resource information/pool to a UE supporting V2X sidelink communication via system information and/or an RRC message and the UE selects a resource according to a set rule. For example, the base station may provide sidelink resource information to the UE by signaling SIB21, SIB26, or SIBx to be newly defined for an NR V2X UE. The base station may provide sidelink resource information by signaling an RRC message, for example, an RRC connection reconfiguration message (RRCReconfiguration message) and/or connection resumption message (RRCResume message), to the UE. Further, UE autonomous resource selection may enable the UE to assist other UEs in selecting a resource to be used for a sidelink through a PC5 RRC message and/or MAC CE, or may allocate a resource to be used for sidelink transmission through direct or indirect scheduling. For example, the UE autonomous resource selection mode may refer to one or more of the following.

UE autonomously selects sidelink resource for transmission
UE assists sidelink resource selection for other UEs
UE is configured with NR-configured grant for sidelink transmission
UE schedules sidelink transmission of other UEs Resource selection methods for a UE may include zone mapping, sensing-based resource selection, random selection, configured-grant-based resource selection, and the like.

The UE supporting V2X sidelink communication may transmit and receive a V2X packet based on a preconfigured resource pool (preconfigured resource) included in SL-V2X-Preconfiguration, which is an information element (hereinafter, "IE"). For example, when the UE exists in the coverage area of the base station but cannot perform V2X sidelink communication based on the scheduled resource allocation and/or UE autonomous resource selection mode for some reason, the UE may perform V2X sidelink communication through a sidelink transmission/reception resource pool preconfigured in SL-V2X-Preconfiguration as the information element (IE). In addition, a vehicle terminal 1e-45 out of the coverage area of terrestrial radio access/new radio (E-UTRA/NR) vehicle terminal 1e-45 may perform V2X sidelink communication with another vehicle terminal 1e-65 or a portable pedestrian UE 1e-55, based on the foregoing preconfigured sidelink resource, through sidelinks (SL) 1e-70 and 1e-75 as transmission channels.

LTE V2X SL communication is designed primarily for basic safety services. For example, a UE supporting LTE V2X SL communication is designed to provide basic safety services to all neighboring UEs supporting LTE V2X SL communication through a broadcast transmission type. Therefore, the UE does not need to perform a process for establishing a session with another particular UE or to perform a sidelink connection establishment procedure.

However, in next-generation mobile communication (NR), V2X SL communication may be designed to provide not only basic safety services but also various and enhanced services (e.g., a self-driving service, a platooning service, a remote driving service, or an in-vehicle infotainment service). Therefore, NR V2X SL communication may be designed to support not only a broadcast transmission type but also a unicast and/or groupcast transmission type.

Figure 6:
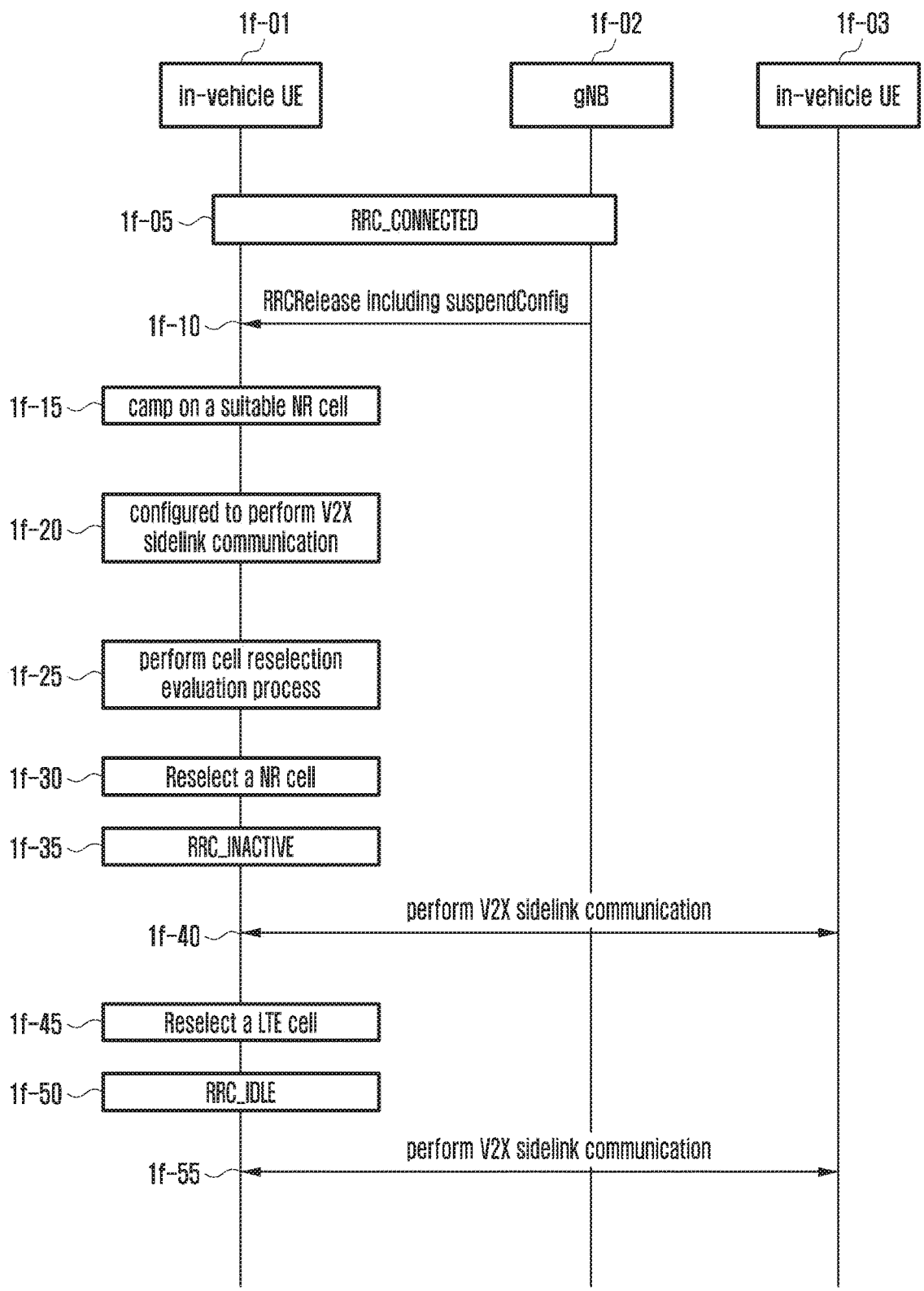
FIG. 6 illustrates a procedure in which a base station releases a connection with a UE to switch from an RRC-connected mode (RRC_CONNECTED) to an RRC inactive mode (RRC_INACTIVE) and a method in which a UE in the RRC inactive mode (RRC_INACTIVE) handles frequency priorities when performing a cell reselection process according to an embodiment of the disclosure.

FIG. 6 illustrates a procedure in which a base station releases a connection with a UE to switch from an RRC-connected mode (RRC_CONNECTED) to an RRC inactive mode (RRC_INACTIVE) and a method in which a UE in the RRC inactive mode (RRC_INACTIVE) handles frequency priorities when performing a cell reselection process according to an embodiment of the disclosure.

Referring to FIG. 6, the UE 1f-01 may establish an RRC connection to the NR base station 1f-02 and thus enter the RRC connected mode (RRC_CONNECTED) by in operation 1f-05. The UE may transmit and receive data to and from the base station 1f-02 in the RRC connected mode. Alternatively, in the RRC connected mode, the UE may obtain V2X sidelink communication configuration information from the base station 1f-02 and may transmit and receive data related to V2X sidelink communication to and from another UE 1f-03.

In operation 1f-10, the UE may receive an RRC connection release message (RRCRelease) including suspension configuration information (suspendConfig) from the base station when there is no data to be transmitted or received for some reason. The message may also include cell reselection priority information (cellReselectionPriorities). Upon receiving the message, the UE may transition from the RRC connected mode to the RRC inactive mode (RRC_INACTIVE).

In operation 1f-15, the UE in the RRC inactive mode may perform a cell selection procedure to find a suitable NR cell and may camp on the NR cell. The cell that the UE camps on by finding a suitable cell in the RRC inactive mode may be referred to as a serving cell. To perform the cell selection procedure, the UE may receive system information (e.g., master information block (MIB) or system information block 1 (SIB1)) broadcast by the cell. Specifically, the UE may derive the reception level (Srxlev) and the reception quality (Squal) of the serving cell using a parameter included in received SIB1. For example, the reception level and reception quality of the serving cell may be obtained using Equation 1 below.

$$Srxlev = Q_{rxlevmeas} - (Q_{rxlevmin} + Q_{rxlevminoffset}) - P_{compensation} - Qoffset_{temp},$$

$$Squal = Q_{qualmeas} - (Q_{qualmin} + Q_{qualminoffset}) - Qoffset_{temp} \quad \text{Equation 1}$$

Parameters used in Equation 1 are defined in 3GPP TS 38.304: "User Equipment (UE) Procedures in Idle Mode and RRC Inactive State". In the following, the same applies to embodiments to which Equation 1 is applied.

example, the V2X sidelink communication configuration information may include V2X sidelink communication reception resource pool (e.g., v2x-CommRxPool), a V2X sidelink communication transmission resource pool (e.g. v2x-CommTxPoolNormalCommon), a V2X sidelink communication transmission resource pool available for an exceptional occasion (e.g., v2x-CommTxPoolExceptional), or an inter-frequency information list for V2X sidelink communication (v2x-InterFreqInfiList). Alternatively, the system information may include an anchor carrier frequency list (anchorCarrierFreqList) including V2X sidelink communication configuration information. For example, the SIB may have the following ASN1 structure.

SystemInformationBlockTypex

The IE SystemInformationBlockTypex contains NR V2X and/or LTE V2X sidelink communication configuration.

SystemInformationBlockTypex Information Element

```
-- ASN1START
SystemInformationBlockTypex ::= SEQUENCE {
    sl-V2X-ConfigCommon                              OPTIONAL,
    lateNonCriticalExtension            OCTET STRING                      OPTIONAL,
    ...
}
SL-V2X-ConfigCommon ::=    SEQUENCE {
    v2x-CommRxPool                      SL-CommRxPoolListV2X              OPTIONAL,
    v2x-CommTxPoolNormalCommon             SL-CommTxPoolListV2X           OPTIONAL,
    p2x-CommTxPoolNormalCommon             SL-CommTxPoolListV2X           OPTIONAL,
    v2x-CommTxPoolExceptional              SL-CommResourcePoolV2X         OPTIONAL,
    v2x-SyncConfig                      SL-SyncConfigListV2X              OPTIONAL,
    v2x-InterFreqInfoList               SL-InterFreqInfoListV2X           OPTIONAL,
    v2x-ResourceSelectionConfig            SL-CommTxPoolSensingConfig     OPTIONAL,
    zoneConfig                          SL-ZoneConfig                     OPTIONAL,
    typeTxSync                          SL-TypeTxSync                     OPTIONAL,
    thresSL-TxPrioritization            SL-Priority                       OPTIONAL,
    anchorCarrierFreqList               SL-AnchorCarrierFreqList-V2X      OPTIONAL,
    offsetDFN                           INTEGER (0..1000)                 OPTIONAL,
    cbr-CommonTxConfigList                 SL-CBR-CommonTxConfigList      OPTIONAL
    cbr-pssch-TxConfigList                 SL-CBR-PPPP-TxConfigList       OPTIONAL,
    v2x-PacketDuplicationConfig            SL-V2X-PacketDuplicationConfig OPTIONAL,
    syncFreqList                        SL-V2X-SyncFreqList               OPTIONAL,
    slss-TxMultiFreq                    ENUMERATED{true}                  OPTIONAL,
    v2x-FreqSelectionConfigList            SL-V2X-FreqSelectionConfigList OPTIONAL,
    threshS-RSSI-CBR                    INTEGER (0..45)                   OPTIONAL,
}
-- ASN1STOP
```

In operation 1f-15, the UE may receive system information (e.g., SIB2, SIB3, SIB4, or SIB5) broadcasted by the cell before or after camping on the cell. SIB2 may include information/parameters commonly applied when the UE in the RRC inactive mode reselects an NR intra-frequency cell, an NR inter-frequency cell, and an inter-RAT frequency cell. SIB3 may include information/parameters applied only when the UE in the RRC inactive mode reselects an NR intra-frequency cell. SIB4 may include information/parameters applied only when the UE in the RRC inactive mode reselects an NR inter-frequency cell. SIB5 may include information/parameters applied only when the UE in the RRC inactive mode reselects an inter-RAT frequency cell. The system information may also include per-frequency cell reselection priority information (cellReselectionPriority).

Alternatively, in operation 1f-15, when the UE in the RRC inactive mode is capable of performing V2X sidelink communication, the UE may receive system information (one or a plurality of new SIB s) including V2X sidelink communication configuration information from the serving cell. The serving cell may separately broadcast the system information for each radio access technology (RAT). For example, There may be one or a plurality of pieces of system information.

In operation 1f-20, the UE in the RRC inactive mode may be configured to perform V2X sidelink communication. Here, the UE may be configured to perform V2X sidelink communication according to the following three cases.

Case 1: The UE is configured to perform LTE V2X sidelink communication from upper layers Case 2: The UE is configured to perform NR V2X sidelink communication from upper layers Case 3: The UE is configured to perform LTE V2X sidelink communication and NR V2X sidelink communication at the same time from upper layers Performing V2X sidelink communication may mean transmitting V2X sidelink communication (i.e., transmitting V2X sidelink data), receiving V2X sidelink communication (i.e., receiving V2X sidelink data), or transmitting and receiving V2X sidelink communication. Operation 1f-20 may occur in operation 1f-15 or operation 1f-25.

In operation 1f-25, the UE in the RRC inactive mode may perform a cell reselection evaluation procedure. The cell reselection evaluation procedure may mean performing the following series of processes.

Reselection priority handling: The UE may apply frequency priority information included in the RRC connection release message or the system information for cell reselection.

Measurement rules for cell reselection: The UE may perform intra-frequency measurement, inter-frequency measurement, or inter-RAT frequency measurement based on measurement rules for cell reselection. The measurement rules may enable measurement to be performed based on frequency priorities and the reception level and reception quality of the serving cell, making it possible to minimize battery consumption by the UE.

Cell reselection criteria: The UE may select a target cell to be finally reselected by applying cell reselection criteria according to the frequency priorities based on a measured value. For example, the cell reselection criteria may refer to NR inter-frequency and inter-RAT cell reselection criteria and intra-frequency and equal priority inter-frequency criteria when the UE camps on an NR cell.

Suitability check: The UE may receive system information (MIB and SIB1) from the target cell to be finally reselected and may evaluate whether the cell can be finally reselected. For example, the UE may evaluate whether the cell is barred through the MIB from the cell and may determine whether the cell satisfies cell selection criteria (Srxlev>0 and Squal>0) through SIB1), thereby finally reselecting the cell.

When the RRC connection release message received in operation 1*f*-10 includes the cell reselection priority information (cellReselectionPriorities), the UE may perform the cell reselection evaluation procedure by applying the cell reselection priority information. When the RRC connection release message received in operation 1*f*-10 does not include the cell reselection priority information (cellReselectionPriorities), the UE may perform the cell reselection evaluation procedure by applying the per-frequency cell reselection priority information (cellReselectionPriority) included in the system information received in operation 1*f*-15. If the UE 1*f*-01 capable of V2X sidelink communication is configured to perform V2X sidelink communication, an embodiment proposes an operation in which the UE handles reselection priorities by applying at least one of the following methods according to Case 1, Case 2, and Case 3 described above.

When the UE is configured to perform V2X sidelink communication according to Case 1:

The UE may be configured to perform LTE V2X sidelink communication through a specific frequency (e.g., f1).

If the UE is capable of performing LTE V2X sidelink communication or only LTE V2X sidelink communication, based on LTE V2X sidelink configuration information provided at the current camping frequency of the UE, the UE may consider the current camping frequency as the highest priority.

If the UE in RRC_INACTIVE is capable of using only a previous configuration while not camping on the specific frequency (f1), the UE may consider an NR frequency providing inter-carrier V2X sidelink configuration information as the highest priority. For example, if an NR frequency (f2) or an NR cell at the NR frequency (f2) provides the LTE V2X sidelink configuration information for the specific frequency (f1), the UE may consider the NR frequency (f2) as the highest priority. If a plurality of NR frequencies provides the LTE V2X sidelink configuration information for the specific frequency (f1), the UE may set the plurality of NR frequencies to the same priority, or may sequentially prioritize the plurality of NR frequencies for implementation.

If one or a plurality of NR frequencies providing the inter-carrier V2X sidelink configuration information does not provide the LTE V2X sidelink configuration information for the specific frequency (f1), the UE may consider the LTE frequency providing the LTE V2X sidelink configuration information for the specific frequency (f1) as the highest priority. For example, the UE may consider the LTE frequency to be a lower priority than the NR frequency providing the inter-carrier V2X sidelink configuration information. Since the UE transitions to an RRC idle mode when reselecting an inter-RAT (E-UTRA) cell in the RRC inactive state, a large number of signaling procedures will be subsequently required to switch from the RRC idle mode to the RRC connected mode through an RRC connection establishment procedure for certain reasons. However, when the NR cell is reselected, the UE and the base station have the context of the UE stored, thus enabling quick access and data transmission or reception with fewer signaling procedures through an RRC connection resume procedure. For example, the disclosure proposes that intra-RAT cell reselection has higher priority than inter-RAT cell reselection.

If both an NR frequency (excluding the camping frequency) including the inter-carrier V2X sidelink configuration information and the LTE frequency are configured for the UE, the NR frequency may be considered as a higher priority, but the NR frequency and the LTE frequency may be considered to have the same priority. When the NR frequency and the LTE frequency are considered to have the same priority, the UE may consider the NR frequency as a higher priority or may consider an arbitrary frequency as the highest priority for implementation.

When the UE is configured to perform V2X sidelink communication according to Case 2:

The UE may be configured to perform NR V2X sidelink communication through a specific frequency (e.g., f1).

If the UE is capable of performing NR V2X sidelink communication or only NR V2X sidelink communication, based on NR V2X sidelink communication configuration information provided at the current camping frequency of the UE, the UE may consider the current camping frequency as the highest priority. For example, if the UE in RRC_INACTIVE is capable of performing only NR V2X sidelink communication while camping on the specific NR frequency (f1), the UE may consider the specific NR frequency (f1) as the highest priority. Alternatively, if the current camping frequency belongs to f2 but provides the NR V2X sidelink communication configuration information for f1, the UE may also consider the current camping frequency as the highest priority.

If the UE in RRC_INACTIVE is capable of using only a previous configuration while not camping on the specific NR frequency (f1), the UE may consider an NR frequency providing inter-carrier V2X sidelink configuration information as the highest priority. For example, if an NR frequency (f2) or an NR cell at the NR frequency (f2) provides the NR V2X sidelink configuration information for the specific frequency (f1), the UE may consider the NR frequency (f2) as the highest priority. If a plurality of NR frequencies provides the NR V2X sidelink configuration information for the specific frequency (f1), the UE may set the plurality of NR frequencies to the same priority, or may sequentially prioritize the plurality of NR frequencies for implementation.

If one or a plurality of NR frequencies providing the inter-carrier V2X sidelink configuration information or a corresponding NR cell does not provide the NR V2X sidelink configuration information for the specific frequency (f1), the UE may consider the LTE frequency providing the NR V2X sidelink configuration information for the specific frequency (f1) as the highest priority. For example, the UE may consider the LTE frequency to be a lower priority than the NR frequency providing the inter-carrier V2X sidelink configuration information. Since the UE transitions to an RRC idle mode when reselecting an inter-RAT (E-UTRA) cell in the RRC inactive state, a large number of signaling procedures will be subsequently required to switch from the RRC idle mode to the RRC connected mode through an RRC connection establishment procedure for certain reasons. However, when the NR cell is reselected, the UE and the base station have the context of the UE stored, thus enabling quick access and data transmission or reception with fewer signaling procedures through an RRC connection resume procedure.

If both an NR frequency (excluding the camping frequency) including the inter-carrier V2X sidelink configuration information and the LTE frequency are configured for the UE, the UE may consider the NR frequency as a higher priority, or the UE may consider the NR frequency and the LTE frequency to have the same priority. When the NR frequency and the LTE frequency are considered to have the same priority, the UE may consider the NR frequency to have a higher priority, or may consider an arbitrary frequency to have the highest priority for implementation.

When the UE is configured to perform V2X sidelink communication according to Case 3:

The UE may be configured to perform NR V2X sidelink communication through a specific frequency (e.g., f1) and to perform LTE V2X sidelink communication through another specific frequency (e.g., f2).

If the UE is capable of performing NR and LTE V2X sidelink communication and or only NR and LTE V2X sidelink communication, based on NR V2X sidelink communication configuration information and LTE V2X sidelink communication configuration information provided at the current camping frequency of the UE, the UE may consider the current camping frequency to have the highest priority. For example, if the NR frequency (f1) provides the NR V2X sidelink configuration information for the specific frequency (f1) and the LTE V2X sidelink configuration information for the other specific frequency (f2) while the UE is camping on the specific NR frequency (f1), the UE may consider the specific NR frequency (f1) to have the highest priority. Alternatively, if the current camping frequency belongs to f2 but provides the NR V2X sidelink communication configuration information for f1 and the LTE V2X sidelink communication configuration information for f2, the UE may also consider the current camping frequency as the highest priority.

If there is an NR frequency (e.g., f3) providing the NR V2X sidelink configuration information for the specific frequency (f1) and the LTE V2X sidelink configuration information for the other specific frequency (f2) while the UE is not camping on the specific NR frequency (f1), the UE may consider the NR frequency (e.g., f3) as the highest priority. If there is a plurality of corresponding NR frequencies (e.g., f3 and f4), the UE may set the plurality of NR frequencies to the same priority or may sequentially prioritize the plurality of NR frequencies for implementation.

If the NR frequency does not exist, the UE may consider an LTE frequency providing the NR V2X sidelink configuration information for the specific frequency (f1) and the LTE V2X sidelink configuration information for the other specific frequency (f2) to have the highest priority. For example, the UE may consider the LTE frequency providing the NR V2X sidelink configuration information for the specific frequency (f1) and the LTE V2X sidelink configuration information for the other specific frequency (f2) to be a lower priority than the NR frequency providing the NR V2X sidelink configuration information for the specific frequency (f1) and the LTE V2X sidelink configuration information for the other specific frequency (f2). Since the UE transitions to the RRC idle mode when reselecting an inter-RAT (E-UTRA) cell in the RRC inactive state, a large number of signaling procedures will be subsequently required to switch from the RRC idle mode to the RRC connected mode through an RRC connection establishment procedure for certain reasons. However, when the NR cell is reselected, the UE and the base station have the context of the UE stored, thus enabling quick access and data transmission or reception with fewer signaling procedures through an RRC connection resume procedure.

If the NR frequency and/or LTE frequency do not exist, the UE may consider an NR frequency providing only the NR V2X sidelink configuration information for the specific NR frequency (f1) or providing only the LTE V2X sidelink communication configuration information for the other specific LTE frequency (f2) as the highest priority. The NR frequency may be the camping frequency or an adjacent frequency. If the NR frequency is the camping frequency, the UE may consider the camping frequency as the highest priority, or may consider the camping frequency and the adjacent frequency to have the same priority. If there is a plurality of NR frequencies having the same priority, the UE may practically/arbitrarily prioritize the NR frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

If there is neither an NR frequency nor an LTE frequency for performing NR and LTE V2X sidelink communication or only NR and LTE V2X sidelink communication based on the NR V2X sidelink communication configuration information and the LTE V2X sidelink communication configuration information and there is no NR frequency providing only the NR V2X sidelink configuration information for the specific NR frequency (f1) or providing only the LTE V2X sidelink communication configuration information for the other specific LTE frequency (f2), the UE may consider an LTE frequency providing only the NR V2X sidelink configuration information for the specific NR frequency (f1) or providing only the LTE V2X sidelink communication configuration information for the other specific LTE frequency (f2) as the highest priority. If there is a plurality of LTE frequencies having the same priority, the UE may practically/arbitrarily prioritize the LTE frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

The UE may be configured to perform NR V2X sidelink communication and LTE V2X sidelink communication through a specific frequency (e.g., f1).

If the NR frequency (f1) provides NR V2X sidelink configuration information and LTE V2X sidelink configuration information for the specific frequency (f1) while the UE is camping on the specific NR frequency (f1), the UE may consider the specific NR frequency (f1) as the highest priority. Alternatively, if the current camping frequency belongs to f2 but provides the NR V2X sidelink communication configuration information and the LTE V2X sidelink communication configuration information for f1, the UE may also consider the current camping frequency as the highest priority.

If there is an NR frequency (e.g., f3) providing the NR V2X sidelink configuration information and the LTE V2X sidelink configuration information for the specific frequency (f1) while the UE is not camping on the specific NR frequency (f1), the UE may consider the NR frequency (e.g., f3) as the highest priority. If there is a plurality of corresponding NR frequencies (e.g., f3 and f4), the UE may set the plurality of NR frequencies to the same priority, or may sequentially prioritize the plurality of NR frequencies for implementation.

If the NR frequency does not exist, the UE may consider the LTE frequency providing the NR V2X sidelink configuration information and the LTE V2X sidelink configuration information for the specific frequency (f1) as the highest priority. For example, the UE may consider the LTE frequency providing the NR V2X sidelink configuration information and the LTE V2X sidelink configuration information for the specific frequency (f1) to be a lower priority than the NR frequency providing the NR V2X sidelink configuration information and the LTE V2X sidelink configuration information for the specific frequency (f1). Since the UE transitions to the RRC idle mode when reselecting an inter-radio access technology (RAT) (E-UTRA) cell in the RRC inactive state, a large number of signaling procedures will be subsequently required to switch from the RRC idle mode to the RRC connected mode through an RRC connection establishment procedure for certain reasons. However, when the NR cell is reselected, the UE and the base station have the context of the UE stored, thus enabling quick access and data transmission or reception with fewer signaling procedures through an RRC connection resume procedure.

If the NR frequency and/or LTE frequency do not exist, the UE may consider an NR frequency providing only the LTE V2X sidelink configuration information for the specific LTE frequency (f1) or providing only the NR V2X sidelink configuration information for the specific NR frequency (f1) as the highest priority. The NR frequency may be the camping frequency or an adjacent frequency. If the NR frequency is the camping frequency, the UE may consider the camping frequency as the highest priority, or may consider the camping frequency and the adjacent frequency to have the same priority. If there is a plurality of NR frequencies having the same priority, the UE may practically/arbitrarily prioritize the NR frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

If there is neither an NR frequency nor an LTE frequency for performing LTE and NR V2X sidelink communication or only LTE and NR V2X sidelink communication based on the LTE V2X sidelink communication configuration information and the NR V2X sidelink communication configuration information and there is no NR frequency providing only the LTE V2X sidelink configuration information for the specific LTE frequency (f1) or providing only the NR V2X sidelink communication configuration information for the specific NR frequency (f1), the UE may consider an LTE frequency providing only the LTE V2X sidelink configuration information for the specific LTE frequency (f1) or providing only the NR V2X sidelink communication configuration information for the specific NR frequency (f1) as the highest priority. If there is a plurality of NR frequencies having the same priority, the UE may practically/arbitrarily prioritize the NR frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

In operation 1*f*-25, the UE in the RRC inactive mode may perform measurement based on frequency priorities, may apply cell reselection criteria, and may perform a suitability check, thereby finally reselecting a cell.

When an NR cell is reselected through operation 1*f*-25 in operation 1*f*-30, the UE may maintain the RRC inactive mode in operation 1*f*-35, and may perform V2X sidelink communication with the other UE 1*f*-03 in operation 1*f*-40.

When an LTE cell is reselected through operation 1*f*-25 in operation 1*f*-45, the UE may transition to the RRC idle mode in operation 1*f*-50, and may perform V2X sidelink communication with the other UE 1*f*-03 in operation 1*f*-55.

The embodiment may be applied equally to the UE in the RRC idle mode (RRC_IDLE). For example, when an NR cell is reselected by applying the same cell reselection priorities, the UE stays in the NR RRC idle mode, when an LTE cell is reselected, the UE transitions to the LTE RRC idle mode.

Figure 7:
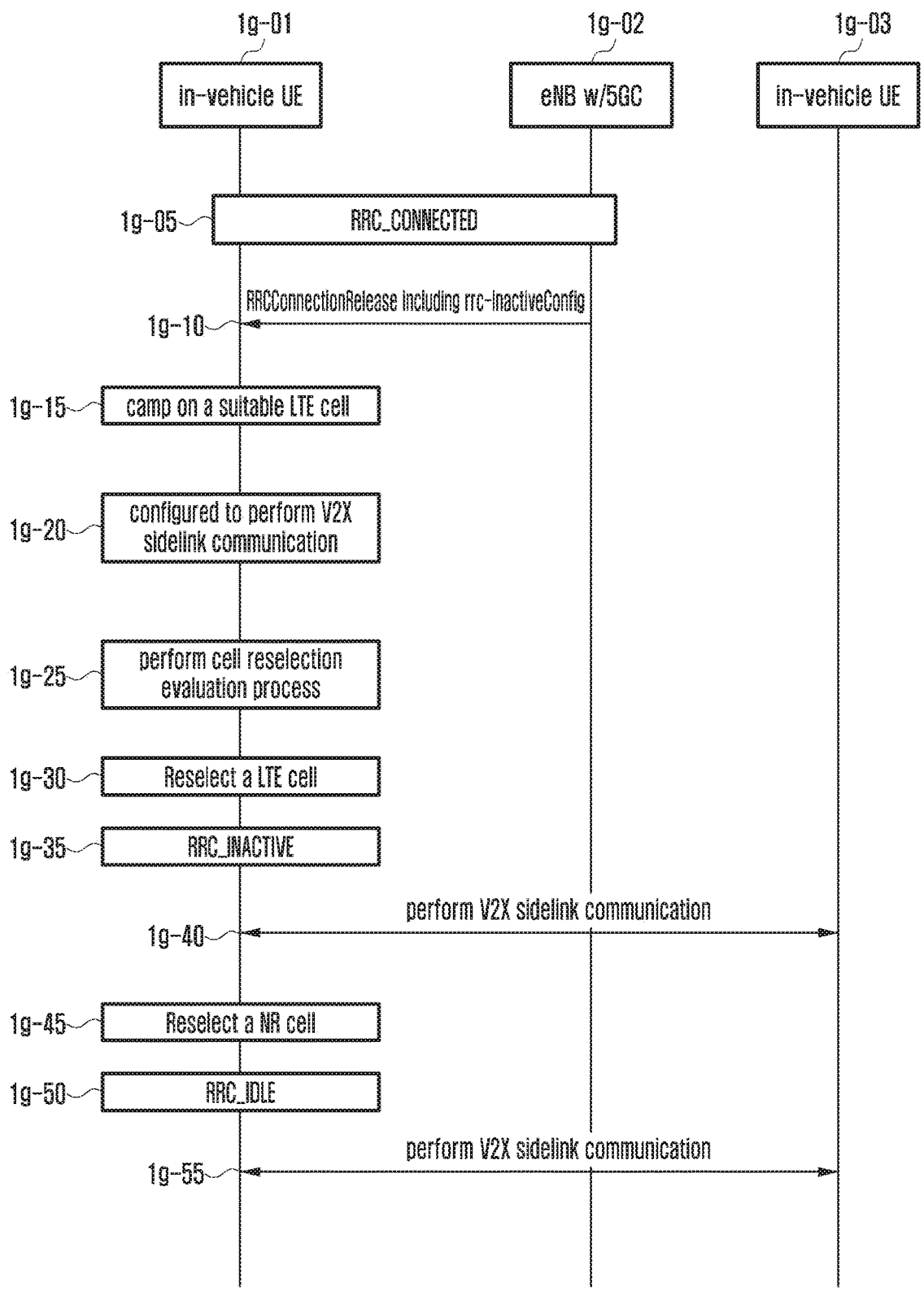
FIG. 7 illustrates a procedure in which a base station releases a connection with a UE to switch from an RRC-connected mode (RRC_CONNECTED) to an RRC inactive mode (RRC_INACTIVE) and a method in which a UE in the RRC inactive mode (RRC_INACTIVE) handles frequency priorities when performing a cell reselection process according to an embodiment of the disclosure.

FIG. 7 illustrates a procedure in which a base station releases a connection with a UE to switch from an RRC-connected mode (RRC_CONNECTED) to an RRC inactive mode (RRC_INACTIVE) and a method in which a UE in the RRC inactive mode (RRC_INACTIVE) handles frequency priorities when performing a cell reselection process according to an embodiment of the disclosure.

Referring to FIG. 7, the UE 1*g*-01 may establish an RRC connection to the LTE base station 1*g*-02 connected to a 5G core and thus enter the RRC connected mode (RRC_CONNECTED) by in operation 1*g*-05. The UE may transmit and receive data to and from the base station 1*g*-02 in the RRC connected mode. Alternatively, in the RRC connected mode, the UE may obtain V2X sidelink communication configuration information from the base station 1g-02 and may transmit and receive data related to V2X sidelink communication to and from another UE 1g-03.

In operation 1g-10, the UE may receive an RRC connection release message (RRCConnectionRelease) including RRC inactivation configuration information (rrc-InactiveConfig) from the base station when there is no data to be transmitted or received for some reason. The message may also include cell reselection priority information (cellReselectionPriorities). Upon receiving the message, the UE may transition from the RRC connected mode to the RRC inactive mode (RRC_INACTIVE).

In operation 1g-15, the UE in the RRC inactive mode may perform a cell selection procedure to find a suitable LTE cell and may camp on the LTE cell. The cell that the UE camps on by finding a suitable cell in the RRC inactive mode may be referred to as a serving cell. To perform the cell selection procedure, the UE may receive system information (e.g., MIB, SIB1, or SIB2) broadcast by the cell. Specifically, the UE may derive the reception level (Srxlev) and the reception quality (Squal) of the serving cell using a parameter included in the received system information. For example, the reception level and reception quality of the serving cell may be obtained using Equation 1 below.

$$Srxlev = Q_{rxlevmeas} - (Q_{rxlevmin} + Q_{rxlevminoffset}) - P_{compensation} - Qoffset_{temp},$$

$$Squal = Q_{qualmeas} - (Q_{qualmin} + Q_{qualminoffset}) - Qoffset_{temp} \quad \text{Equation 1}$$

Parameters used in Equation 1 are defined in 3GPP TS 36.304: "User Equipment (UE) Procedures in Idle Mode". In the following, the same applies to embodiments to which Equation 1 is applied.

In operation 1g-15, the UE may receive system information (e.g., SIB3, SIB4, SIB5, or SIB24) broadcasted by the cell before or after camping on the cell. SIB3 may include information/parameters commonly applied when the UE in the RRC inactive mode reselects an LTE intra-frequency cell, an LTE inter-frequency cell, and an inter-RAT frequency cell. SIB4 may include information/parameters applied only when the UE in the RRC inactive mode reselects an LTE intra-frequency cell. SIB5 may include information/parameters applied only when the UE in the RRC inactive mode reselects an LTE inter-frequency cell. SIB24 may include information/parameters applied only when the UE in the RRC inactive mode reselects an inter-RAT frequency NR cell. The system information may also include per-frequency cell reselection priority information (cellReselectionPriority).

Alternatively, in operation 1g-15, when the UE in the RRC inactive mode is capable of performing V2X sidelink communication, the UE may receive system information (SIB21, SIB26, or one or a plurality of new SIBs) including V2X sidelink communication configuration information from the serving cell. The serving cell may separately broadcast the system information for each radio access technology (RAT). For example, the V2X sidelink communication configuration information may include a V2X sidelink communication reception resource pool (e.g., v2x-CommRxPool), a V2X sidelink communication transmission resource pool (e.g., v2x-CommTxPoolNormalCommon), a V2X sidelink communication transmission resource pool available for an exceptional occasion (e.g., v2x-CommTxPoolExceptional), or an inter-frequency information list for V2X sidelink communication (v2x-InterFreqInfiList). For example, SIB21 and SIB26 may have the ASN1 structure mentioned in 3GPP TS 36.331: "Radio Resource Control (RRC)". Alternatively, the system information may include an anchor carrier frequency list (anchorCarrierFreqList) including V2X sidelink communication configuration information. The new SIB may have the following abstract syntax notation 1 (ASN1) structure.

SystemInformationBlockTypex

The IE SystemInformationBlockTypex contains NR V2X and/or LTE V2X sidelink communication configuration.

SystemInformationBlockTypex Information Element

```
-- ASN1START
SystemInformationBlockTypex ::= SEQUENCE {
    sl-V2X-ConfigCommon           SL-V2X-ConfigCommon          OPTIONAL,
    lateNonCriticalExtension      OCTET STRING                 OPTIONAL,
    ...
}
SL-V2X-ConfigCommon ::=    SEQUENCE {
    v2x-CommRxPool                SL-CommRxPoolListV2X         OPTIONAL,
    v2x-CommTxPoolNormalCommon    SL-CommTxPoolListV2X         OPTIONAL,
    p2x-CommTxPoolNormalCommon    SL-CommTxPoolListV2X         OPTIONAL,
    v2x-CommTxPoolExceptional     SL-CommResourcePoolV2X       OPTIONAL,
    v2x-SyncConfig                SL-SyncConfigListV2X         OPTIONAL,
    v2x-InterFreqInfoList         SL-InterFreqInfoListV2X      OPTIONAL,
    v2x-ResourceSelectionConfig   SL-CommTxPoolSensingConfig   OPTIONAL,
    zoneConfig                    SL-ZoneConfig                OPTIONAL,
    typeTxSync                    SL-TypeTxSync                OPTIONAL,
    thresSL-TxPrioritization      SL-Priority                  OPTIONAL,
    anchorCarrierFreqList         SL-AnchorCarrierFreqList-V2X OPTIONAL,
    offsetDFN                     INTEGER (0..1000)                 OPTIONAL,
    cbr-CommonTxConfigList        SL-CBR-CommonTxConfigList    OPTIONAL
    cbr-pssch-TxConfigList        SL-CBR-PPPP-TxConfigList     OPTIONAL,
    v2x-PacketDuplicationConfig   SL-V2X-PacketDuplicationConfig   OPTIONAL, syncFreqList             SL-V2X-SyncFreqList OPTIONAL,
    slss-TxMultiFreq              ENUMERATED{true}                  OPTIONAL,
    v2x-FreqSelectionConfigList   SL-V2X-FreqSelectionConfigList OPTIONAL,
    threshS-RSSI-CBR              INTEGER (0..45)                   OPTIONAL,
}
-- ASN1STOP
```

There may be one or a plurality of new SIBs.

In operation 1g-20, the UE in the RRC inactive mode may be configured to perform V2X sidelink communication.

Here, the UE may be configured to perform V2X sidelink communication according to the following three cases.

Case 1: The UE is configured to perform LTE V2X sidelink communication from upper layers Case 2: The UE is configured to perform NR V2X sidelink communication from upper layers Case 3: The UE is configured to perform LTE V2X sidelink communication and NR V2X sidelink communication at the same time from upper layers Performing V2X sidelink communication may mean transmitting V2X sidelink communication (i.e., transmitting V2X sidelink data), receiving V2X sidelink communication (i.e., receiving V2X sidelink data), or transmitting and receiving V2X sidelink communication. Operation 1g-20 may occur in operation 1g-15 or operation 1g-25.

In operation 1g-25, the UE in the RRC inactive mode may perform a cell reselection evaluation procedure. The cell reselection evaluation procedure may mean performing the following series of processes.

Reselection priority handling: The UE may apply frequency priority information included in the RRC connection release message or the system information for cell reselection.

Measurement rules for cell reselection: The UE may perform intra-frequency measurement, inter-frequency measurement, or inter-RAT frequency measurement based on measurement rules for cell reselection. The measurement rules may enable measurement to be performed based on frequency priorities and the reception level and reception quality of the serving cell, making it possible to minimize battery consumption by the UE.

Cell reselection criteria: The UE may select a target cell to be finally reselected by applying cell reselection criteria according to the frequency priorities based on a measured value. For example, the cell reselection criteria may refer to E-UTRAN inter-frequency and inter-RAT cell reselection criteria and intra-frequency and equal priority inter-frequency criteria when the UE camps on an NR cell.

Suitability check: The UE may receive system information (MIB, SIB1, and/or SIB2) from the target cell to be finally reselected, and may evaluate whether the cell can be finally reselected. For example, the UE may evaluate whether the cell is barred through SIB1 from the cell, and may determine whether the cell satisfies cell selection criteria (Srxlev>0 and Squal>0) through SIB1 and/or SIB2, thereby finally reselecting the cell.

When the RRC connection release message received in operation 1g-10 includes the cell reselection priority information (cellReselectionPriorities), the UE may perform the cell reselection evaluation procedure by applying the cell reselection priority information. When the RRC connection release message received in operation 1g-10 does not include the cell reselection priority information (cellReselectionPriorities), the UE may perform the cell reselection evaluation procedure by applying the per-frequency cell reselection priority information (cellReselectionPriority) included in the system information received in operation 1g-15. If the UE 1g-01 capable of V2X sidelink communication is configured to perform V2X sidelink communication, an embodiment proposes an operation in which the UE handles reselection priorities by applying at least one of the following methods according to Case 1, Case 2, and Case 3 described above.

When the UE is configured to perform V2X sidelink communication according to Case 1:

The UE may be configured to perform LTE V2X sidelink communication through a specific frequency (e.g., f1).

If the UE is capable of performing LTE V2X sidelink communication or only LTE V2X sidelink communication, based on LTE V2X sidelink configuration information provided at the current camping frequency of the UE, the UE may consider the current camping frequency as the highest priority. For example, if the UE in RRC_INACTIVE is capable of performing LTE V2X sidelink communication or only LTE V2X sidelink communication while camping on the specific LTE frequency (f1), the UE may consider the specific LTE frequency (f1) as the highest priority.

If the UE in the RRC_INACTIVE state is capable of using only a previous configuration while not camping on the specific LTE frequency (f1), the UE may consider an LTE frequency providing inter-carrier V2X sidelink configuration information as the highest priority. For example, if an LTE frequency (f2) or an LTE cell at the LTE frequency (f2) provides the LTE V2X sidelink configuration information for the specific frequency (f1), the UE may consider the LTE frequency (f2) as the highest priority. If a plurality of LTE frequencies provides the LTE V2X sidelink configuration information for the specific frequency (f1), the UE may set the plurality of LTE frequencies to the same priority, or may sequentially prioritize the plurality of LTE frequencies for implementation.

If one or a plurality of LTE frequencies providing the inter-carrier V2X sidelink configuration information or a corresponding LTE cell does not provide the LTE V2X sidelink configuration information for the specific frequency (f1), the UE may consider the NR frequency providing the LTE V2X sidelink configuration information for the specific frequency (f1) as the highest priority. For example, the UE may consider the NR frequency to be a lower priority than the LTE frequency providing the inter-carrier V2X sidelink configuration information. Since the UE transitions to an RRC idle mode when reselecting an inter-RAT (E-UTRA) cell in the RRC inactive state, a large number of signaling procedures is subsequently required in order to switch from the RRC idle mode to the RRC connected mode through an RRC connection establishment procedure for certain reasons. However, when the LTE cell is reselected, the UE and the base station have the context of the UE stored, thus enabling quick access and data transmission or reception with fewer signaling procedures through an RRC connection resume procedure. For example, the disclosure proposes that intra-RAT cell reselection has a higher priority than inter-RAT cell reselection.

When the UE is configured to perform V2X sidelink communication according to Case 2:

The UE may be configured to perform NR V2X sidelink communication through a specific frequency (e.g., f1).

If the UE is capable of performing NR V2X sidelink communication or only NR V2X sidelink communication, based on NR V2X sidelink communication configuration information provided at the current camping frequency of the UE, the UE may consider the current camping frequency as the highest priority.

If the UE in RRC_INACTIVE is capable of using only a previous configuration while not camping on the specific LTE frequency (f1), the UE may consider an LTE frequency providing intra-carrier or inter-carrier NR V2X sidelink configuration information as the highest priority. For example, if an LTE frequency (f1 or f2) or an LTE cell at the LTE frequency (f2) provides the NR V2X sidelink configuration information for the specific frequency (f1 or f2), the UE may consider the LTE frequency (f2) as the highest priority. If a plurality of LTE frequencies provides the NR V2X sidelink configuration information for the specific frequency (f1), the UE may set the plurality of LTE frequencies to the same priority, or may sequentially prioritize the plurality of LTE frequencies for implementation.

If one or a plurality of LTE frequencies providing the intra-carrier or inter-carrier V2X sidelink configuration information does not provide the NR V2X sidelink configuration information for the specific frequency (f1), the UE may consider the NR frequency providing the NR V2X sidelink configuration information for the specific frequency (f1) as the highest priority. For example, the UE may consider the NR frequency to be a lower priority than the LTE frequency providing the inter-carrier V2X sidelink configuration information. Since the UE transitions to an RRC idle mode when reselecting an inter-RAT (E-UTRA) cell in the RRC inactive state, a large number of signaling procedures will be subsequently required to switch from the RRC idle mode to the RRC connected mode through an RRC connection establishment procedure for certain reasons. However, when the LTE cell is reselected, the UE and the base station have the context of the UE stored, thus enabling quick access and data transmission or reception with fewer signaling procedures through an RRC connection resume procedure. For example, the disclosure proposes that intra-RAT cell reselection has a higher priority than inter-RAT cell reselection.

If both an LTE frequency (excluding the camping frequency) including the inter-carrier V2X sidelink configuration information and the NR frequency are configured for the UE, the UE may consider the LTE frequency as a higher priority, or the UE may consider the LTE frequency and the NR frequency to have the same priority. When the LTE frequency and the NR frequency are considered to have the same priority, the UE may consider the LTE frequency to have a higher priority, or may consider an arbitrary frequency as the highest priority for implementation.

When the UE is configured to perform V2X sidelink communication according to Case 3:

The UE may be configured to perform LTE V2X sidelink communication through a specific frequency (e.g., f1) and to perform NR V2X sidelink communication through another specific frequency (e.g., f2).

If the UE is capable of performing LTE and NR V2X sidelink communication or only LTE and NR sidelink communication, based on LTE V2X sidelink communication configuration information and NR V2X sidelink communication configuration information provided at the current camping frequency of the UE, the UE may consider the current camping frequency as the highest priority. For example, if the LTE frequency (f1) provides the LTE V2X sidelink configuration information for the specific frequency (f1) and the NR V2X sidelink configuration information for the other specific frequency (f2) while the UE is camping on the specific LTE frequency (f1), the UE may consider the specific LTE frequency (f1) as the highest priority. Alternatively, if the current camping frequency belongs to f2 but provides the LTE V2X sidelink communication configuration information for f1 and the NR V2X sidelink communication configuration information for f2, the UE may also consider the current camping frequency as the highest priority.

If there is an LTE frequency (e.g., f3) providing the LTE V2X sidelink configuration information for the specific frequency (f1) and the NR V2X sidelink configuration information for the other specific frequency (f2) while the UE is not camping on the specific LTE frequency (f1), the UE may consider the LTE frequency (e.g., f3) as the highest priority. If there is a plurality of corresponding LTE frequencies (e.g., f3 and f4), the UE may set the plurality of LTE frequencies to the same priority, or may sequentially prioritize the plurality of LTE frequencies for implementation.

If the LTE frequency does not exist, the UE may consider an NR frequency providing the LTE V2X sidelink configuration information for the specific frequency (f1) and the NR V2X sidelink configuration information for the other specific frequency (f2) as the highest priority. For example, the UE may consider the NR frequency providing the LTE V2X sidelink configuration information for the specific frequency (f1) and the NR V2X sidelink configuration information for the other specific frequency (f2) to have a lower priority than the LTE frequency providing the LTE V2X sidelink configuration information for the specific frequency (f1) and the NR V2X sidelink configuration information for the other specific frequency (f2). Since the UE transitions to the RRC idle mode when reselecting an inter-RAT (E-UTRA) cell in the RRC inactive state, a large number of signaling procedures will be subsequently required to switch from the RRC idle mode to the RRC connected mode through an RRC connection establishment procedure for certain reasons. However, when the LTE cell is reselected, the UE and the base station have the context of the UE stored, thus enabling quick access and data transmission or reception with fewer signaling procedures through an RRC connection resume procedure.

If the NR frequency and/or LTE frequency do not exist, the UE may consider an LTE frequency providing only the LTE V2X sidelink configuration information for the specific LTE frequency (f1) or providing only the NR V2X sidelink communication configuration information for the other specific NR frequency (f2) as the highest priority. The LTE frequency may be the camping frequency or an adjacent frequency. If the LTE frequency is the camping frequency, the UE may consider the camping frequency as the highest priority or may consider the camping frequency and the adjacent frequency as the same priority. If there is a plurality of LTE frequencies having the same priority, the UE may practically/arbitrarily prioritize the LTE frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

If there is neither an NR frequency nor an LTE frequency for performing LTE and NR V2X sidelink communication or only LTE and NR V2X sidelink communication based on the LTE V2X sidelink communication configuration information and the NR V2X sidelink communication configuration information and there is no LTE frequency providing only the LTE V2X sidelink configuration information for the specific LTE frequency (f1) or providing only the NR V2X sidelink communication configuration information for the other specific NR frequency (f2), the UE may consider an NR frequency providing only the LTE V2X sidelink configuration information for the specific LTE frequency (f1) or providing only the NR V2X sidelink communication configuration information for the other specific frequency (f2) as the highest priority. If there is a plurality of NR frequencies having the same priority, the UE may practically/arbitrarily prioritize the NR frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

The UE may be configured to perform NR V2X sidelink communication and LTE V2X sidelink communication through a specific frequency (e.g., f1).

If the LTE frequency (f1) provides NR V2X sidelink configuration information and LTE V2X sidelink configuration information for the specific frequency (f1) while the UE is camping on the specific LTE frequency (f1), the UE may consider the specific LTE frequency (f1) as the highest priority. Alternatively, if the current camping frequency belongs to f2 but provides the NR V2X sidelink communication configuration information and the LTE V2X sidelink communication configuration information for f1, the UE may also consider the current camping frequency as the highest priority.

If there is an LTE frequency (e.g., f3) providing the NR V2X sidelink configuration information and the LTE V2X sidelink configuration information for the specific frequency (f1) while the UE is not camping on the specific LTE frequency (f1), the UE may consider the LTE frequency (e.g., f3) as the highest priority. If there is a plurality of corresponding LTE frequencies (e.g., f3 and f4), the UE may set the plurality of LTE frequencies to the same priority, or may sequentially prioritize the plurality of LTE frequencies for implementation.

If the LTE frequency does not exist, the UE may consider an NR frequency providing the NR V2X sidelink configuration information and the LTE V2X sidelink configuration information for the specific frequency (f1) as the highest priority. For example, the UE may consider the NR frequency providing the NR V2X sidelink configuration information and the LTE V2X sidelink configuration information for the specific frequency (f1) to be a lower priority than the LTE frequency providing the NR V2X sidelink configuration information and the LTE V2X sidelink configuration information for the specific frequency (f1). Since the UE transitions to the RRC idle mode when reselecting an inter-RAT (E-UTRA) cell in the RRC inactive state, a large number of signaling procedures will be subsequently required to switch from the RRC idle mode to the RRC connected mode through an RRC connection establishment procedure for certain reasons. However, when the LTE cell is reselected, the UE and the base station have the context of the UE stored, thus enabling quick access and data transmission or reception with fewer signaling procedures through an RRC connection resume procedure.

If the NR frequency and/or LTE frequency do not exist, the UE may consider an LTE frequency providing only the LTE V2X sidelink configuration information for the specific LTE frequency (f1) or providing only the NR V2X sidelink configuration information for the specific NR frequency (f1) as the highest priority. The LTE frequency may be the camping frequency or an adjacent frequency. If the LTE frequency is the camping frequency, the UE may consider the camping frequency as the highest priority or may consider the camping frequency and the adjacent frequency as the same priority. If there is a plurality of LTE frequencies having the same priority, the UE may practically/arbitrarily prioritize the LTE frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous-configuration.

If there is neither an NR frequency nor an LTE frequency for performing LTE and NR V2X sidelink communication or only LTE and NR V2X sidelink communication based on the LTE V2X sidelink communication configuration information and the NR V2X sidelink communication configuration information and there is no LTE frequency providing only the LTE V2X sidelink configuration information for the specific LTE frequency (f1) or providing only the NR V2X sidelink communication configuration information for the specific NR frequency (f1), the UE may consider an NR frequency providing only the LTE V2X sidelink configuration information for the specific LTE frequency (f1) or providing only the NR V2X sidelink communication configuration information for the specific NR frequency (f1) as the highest priority. If there is a plurality of NR frequencies having the same priority, the UE may practically/arbitrarily prioritize the NR frequencies. Here, if there is no NR V2X sidelink communication configuration information, the UE may perform NR V2X sidelink communication according to a previous configuration, if there is no LTE V2X sidelink communication configuration information, the UE may perform LTE V2X sidelink communication according to the previous configuration.

In operation 1g-25, the UE in the RRC inactive mode may perform measurement based on frequency priorities, may apply cell reselection criteria, and may perform a suitability check, thereby finally reselecting a cell.

When an LTE cell is reselected through operation 1g-25 in operation 1g-30, the UE may maintain the RRC inactive mode in operation 1g-35 and may perform V2X sidelink communication with the other UE 1g-03 in operation 1g-40.

When an NR cell is reselected through operation 1g-25 in operation 1g-45, the UE may transition to the RRC idle mode in operation 1g-50, and may perform V2X sidelink communication with the other UE 1g-03 in operation 1g-55.

The embodiment may be applied equally to the UE in the RRC idle mode (RRC_IDLE). For example, when an LTE cell is reselected by applying the same cell reselection priorities, the UE stays in the LTE RRC idle mode, when an NR cell is reselected, the UE transitions to the NR RRC idle mode.

Figure 8:
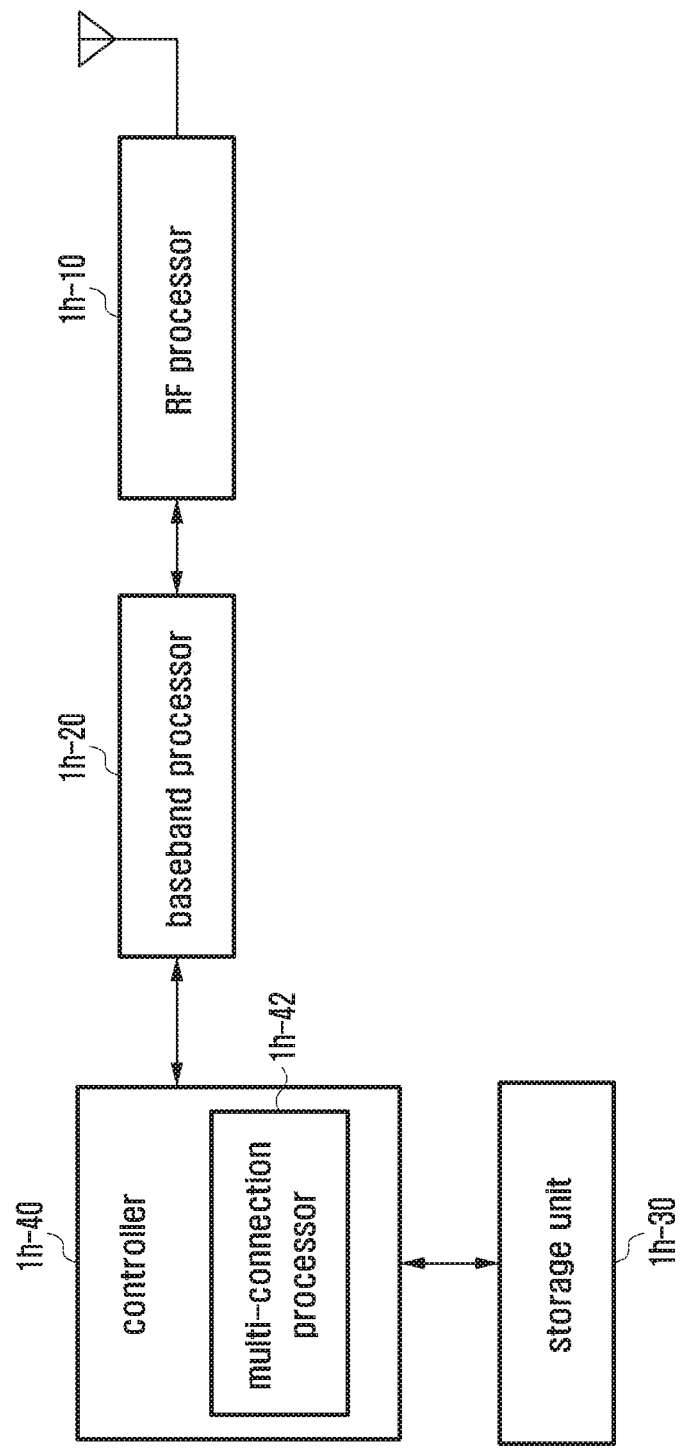
FIG. 8 illustrates a configuration of a UE according to an embodiment of the disclosure.

FIG. 8 illustrates a configuration of a UE according to an embodiment of the disclosure.

Referring to FIG. 8, the UE may include a radio frequency (RF) processor 1*h*-10, a baseband processor 1*h*-20, a storage unit 1*h*-30, and a controller 1*h*-40.

The RF processor 1h-10 according to an embodiment may perform a function for transmitting or receiving a signal through a wireless channel, such as band conversion and amplification of a signal. For example, the RF processor 1h-10 may upconvert a baseband signal, provided from the baseband processor 1h-20, into an RF band signal to transmit the RF band signal through an antenna, and may downconvert an RF band signal, received through the antenna, into a baseband signal. For example, the RF processor 1h-10 may include a transmission filter, a reception filter, an amplifier, a mixer, an oscillator, a digital-to-analog converter (DAC), and an analog-to-digital converter (ADC).

Although FIG. 8 shows only one antenna, the UE may include a plurality of antennas.

In addition, the RF processor 1h-10 may include a plurality of radio frequency (RF) chains. Further, the RF processor 1h-10 may perform beamforming. For beamforming, the RF processor 1h-10 may adjust the phase and strength of each of signals transmitted and received through a plurality of antennas or antenna elements. The RF processor 1h-10 may perform multiple-input and multiple-output (MIMO) and may receive a plurality of layers when performing MIMO. The RF processor 1h-10 may perform reception beam sweeping by appropriately setting the plurality of antennas or antenna elements under the control of the controller 1h-40, or may adjust the orientation and width of a reception beam such that the reception beam is coordinated with a transmission beam.

The baseband processor 1h-20 may perform a function of converting a baseband signal and a bit stream according to the physical-layer specification of a system. For example, in data transmission, the baseband processor 1h-20 may encode and modulate a transmission bit stream, thereby generating complex symbols. In data reception, the baseband processor 1h-20 may demodulate and decode a baseband signal, provided from the RF processor 1h-10, thereby reconstructing a reception bit stream. For example, according to OFDM, in data transmission, the baseband processor 1h-20 may generate complex symbols by encoding and modulating a transmission bit stream, may map the complex symbols to subcarriers, and may construct OFDM symbols through an inverse fast Fourier transform (IFFT) and cyclic prefix (CP) insertion. In data reception, the baseband processor 1h-20 may divide a baseband signal, provided from the RF processor 1h-10, into OFDM symbols, may reconstruct signals mapped to subcarriers through a fast Fourier transform (FFT), and may reconstruct a reception bit stream through demodulation and decoding.

As described above, the baseband processor 1h-20 and the RF processor 1h-10 may transmit and receive signals. Accordingly, the baseband processor 1h-20 and the RF processor 1h-10 may be referred to as a transmitter, a receiver, a transceiver, or a communication unit. At least one of the baseband processor 1h-20 and the RF processor 1h-10 may include a plurality of communication modules to support a plurality of different radio access technologies. Further, at least one of the baseband processor 1h-20 and the RF processor 1h-10 may include different communication modules for processing signals in different frequency bands. For example, the different radio access technologies may include an LTE network, an NR network, and the like. In addition, the different frequency bands may include a super-high-frequency (SHF) band (e.g., 2.2 GHz or 2 GHz) and a millimeter (mm)-wave band (e.g., 60 GHz).

The storage unit 1h-30 may store data, such as a default program, an application, and configuration information for operating the UE. The storage unit 1h-30 may provide stored data upon request from the controller 1h-40.

The controller 1h-40 may control the overall operation of the UE. For example, the controller 1h-40 may transmit and receive signals through the baseband processor 1h-20 and the RF processor 1h-10. Further, the controller 1h-40 may record and read data in the storage unit 1h-40. To this end, the controller 1h-40 may include at least one processor (e.g., a multi-connection processor 1h-42). For example, the controller 1h-40 may include a communication processor (CP) to perform control for communication and an application processor (AP) to control an upper layer, such as an application.

Figure 9:
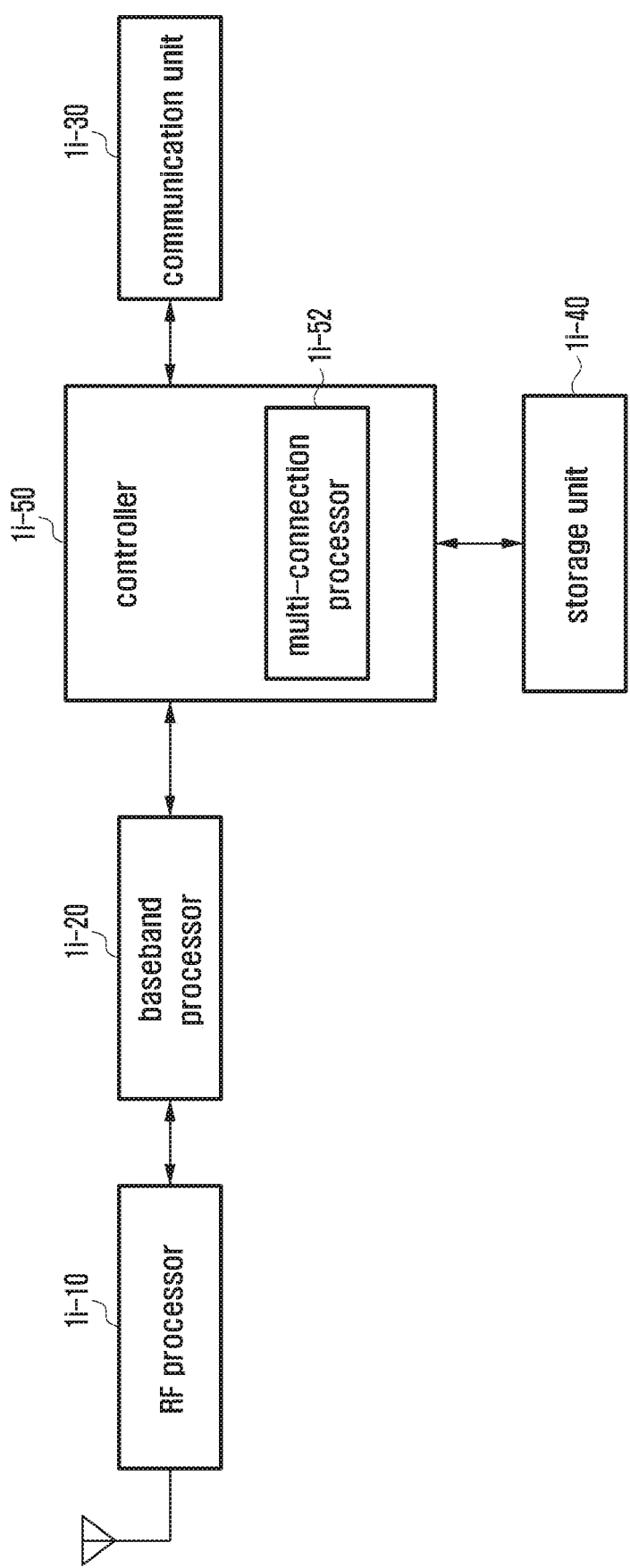
FIG. 9 illustrates a configuration of a base station according to an embodiment of the disclosure.

FIG. 9 illustrates a configuration of a base station according to an embodiment of the disclosure.

Referring to FIG. 9, the base station according to the embodiment may include one or more transmission and reception points (TRPs).

The base station according to the embodiment may include an RF processor 1i-10, a baseband processor 1i-20, a communication unit 1i-30, a storage unit 1i-40, and a controller 1i-50.

The RF processor 1i-10 may perform a function for transmitting or receiving a signal through a wireless channel, such as band conversion and amplification of a signal. For example, the RF processor 1i-10 may upconvert a baseband signal, provided from the baseband processor 1i-20, into an RF band signal to transmit the RF band signal through an antenna, and may downconvert an RF band signal, received through the antenna, into a baseband signal. For example, the RF processor 1i-10 may include a transmission filter, a reception filter, an amplifier, a mixer, an oscillator, a DAC, and an ADC.

Although FIG. 9 shows only one antenna, the base station may include a plurality of antennas.

In addition, the RF processor 1i-10 may include a plurality of RF chains. Further, the RF processor 1i-10 may perform beamforming. For beamforming, the RF processor 1i-10 may adjust the phase and strength of each of signals transmitted and received through a plurality of antennas or antenna elements. The RF processor 1i-10 may transmit one or more layers, thereby performing downlink MIMO.

The baseband processor 1i-20 may perform a function of converting a baseband signal and a bit stream according to the physical-layer specification of a first radio access technology. For example, in data transmission, the baseband processor 1i-20 may encode and modulate a transmission bit stream, thereby generating complex symbols. In data reception, the baseband processor 1i-20 may demodulate and decode a baseband signal provided from the RF processor 1i-10, thereby reconstructing a reception bit stream. For example, according to OFDM, in data transmission, the baseband processor 1i-20 may generate complex symbols by encoding and modulating a transmission bit stream, may map the complex symbols to subcarriers, and may construct OFDM symbols through an IFFT and CP insertion. In data reception, the baseband processor 1i-20 may divide a baseband signal, provided from the RF processor 1i-10, into OFDM symbols, may reconstruct signals mapped to subcarriers through an FFT, and may reconstruct a reception bit stream through demodulation and decoding. As described above, the baseband processor 1i-20 and the RF processor 1i-10 may transmit and receive signals.

Accordingly, the baseband processor 1i-20 and the RF processor 1i-10 may be referred to as a transmitter, a receiver, a transceiver, a communication unit, or a wireless communication unit.

The communication unit 1i-30 may provide an interface for performing communication with other nodes in a network. For example, the communication unit 1i-30 may convert a bit stream, transmitted from a main base station to another node, for example, a secondary base station or a core network, into a physical signal, and may convert a physical signal, received from the other node, into a bit stream.

The storage unit 1i-40 may store data, such as a default program, an application, and configuration information for operating the main base station. In particular, the storage unit 1i-40 may store information on a bearer allocated to a connected UE, a measurement result reported from a connected UE, and the like. In addition, the storage unit 1i-40 may store information as a criterion for determining whether to provide or stop multiple connections to a UE. The storage unit 1i-40 may provide stored data in response to a request from the controller 1i-50.

The controller 1i-50 may control the overall operation of the main base station. For example, the controller 1i-50 may transmit and receive signals through the baseband processor 1i-20 and the RF processor 1i-10 or through the communication unit 1i-30. Further, the controller 1i-50 may record and read data in the storage unit 1i-40. To this end, the controller 1i-50 may include at least one processor (e.g., a multi-connection processor 1i-52).

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message for suspending an RRC connection between the terminal and the base station;
   identifying whether the terminal is configured to perform both a new radio (NR) sidelink communication and a vehicle to everything (V2X) sidelink communication during the terminal being in an RRC inactive state;
   in case that the terminal is configured to perform both the NR sidelink communication and the V2X sidelink communication, identifying whether a first frequency for a cell selection and reselection is identified, the first frequency providing both a NR sidelink communication configuration and a V2X sidelink communication configuration;
   determining the first frequency to be a highest priority for the cell selection and reselection, in case that the first frequency is identified;
   determining a second frequency to be the highest priority for the cell selection and reselection, in case that the first frequency is not identified, the second frequency providing either the NR sidelink communication configuration or the V2X sidelink communication configuration; and
   in case that the terminal is configured to perform the NR sidelink communication or the V2X sidelink communication, determining that frequencies providing an intra-carrier configuration and an inter-carrier configuration have an equal priority for the cell selection and reselection.

2. The method of claim 1, in case that the terminal configured to perform both the NR sidelink communication and the V2X sidelink communication, further comprising:
   identifying that each of the first frequency and the second frequency includes a plurality of frequencies; and
   selecting a specific frequency for the cell selection and reselection among the plurality of frequencies,
   wherein a radio access technology (RAT) of the specific frequency is same as a RAT used by a frequency on which the terminal is camping.

3. The method of claim 1, further comprising:
   selecting or reselecting a cell among a plurality of cells for the first frequency; and
   performing the NR sidelink communication based on the NR sidelink communication configuration and the V2X sidelink communication based on the V2X sidelink communication configuration, in the cell.

4. The method of claim 1, further comprising:
   selecting or reselecting a cell among a plurality of cells for the second frequency; and
   performing the NR sidelink communication based on the NR sidelink communication configuration and the V2X sidelink communication based on a preconfiguration in the cell, in case that the second frequency provides the NR sidelink communication configuration.

5. The method of claim 1, further comprising:
selecting or reselecting a cell among a plurality of cells for the second frequency; and
performing the V2X sidelink communication based on the V2X sidelink communication configuration and the NR sidelink communication based on a preconfiguration in the cell, in case that the second frequency provides the V2X sidelink communication configuration.

6. The method of claim 1, wherein the V2X sidelink communication uses an evolved-universal mobile telecommunications system (UMTS) terrestrial radio access (E-UTRA) technology.

7. The method of claim 1, further comprising:
reselecting a cell of the first frequency or the second frequency, in case that the terminal is in a state of camping on another cell.

8. The method of claim 7, further comprising:
performing a transition to an RRC idle state, in case that a radio access technology (RAT) used by the cell is different from a RAT used by the another cell.

9. The method of claim 1, wherein the NR sidelink communication configuration and the V2X sidelink communication configuration are configured by an upper layer of an access stratum (AS) layer.

10. A terminal in a wireless communication system, the terminal comprising:
a transceiver; and
at least one processor configured to:
control the transceiver to receive, from a base station, a radio resource control (RRC) message for suspending an RRC connection between the terminal and the base station,
identify whether the terminal is configured to perform both a new radio (NR) sidelink communication and a vehicle to everything (V2X) sidelink communication during the terminal being in an RRC inactive state,
in case that the terminal is configured to perform both the NR sidelink communication and the V2X sidelink communication, identify whether a first frequency for a cell selection and reselection is identified, the first frequency providing both a NR sidelink communication configuration and a V2X sidelink communication configuration,
determine the first frequency to be a highest priority for the cell selection and reselection, in case that the first frequency is identified,
determine a second frequency to be the highest priority for the cell selection and reselection, in case that the first frequency is not identified, the second frequency providing either the NR sidelink communication configuration or the V2X sidelink communication configuration, and
in case that the terminal is configured to perform the NR sidelink communication or the V2X sidelink communication, determine that frequencies providing an intra-carrier configuration and an inter-carrier configuration have an equal priority for the cell selection and reselection.

11. The terminal of claim 10, in case that the terminal is configured to perform both the NR sidelink communication and the V2X sidelink communication,
wherein the at least one processor is further configured to:
identify that each of the first frequency and the second frequency includes a plurality of frequencies, and
select a specific frequency for the cell selection and reselection among the plurality of frequencies, and
wherein a radio access technology (RAT) of the specific frequency is same as a RAT used by a frequency on which the terminal is camping.

12. The terminal of claim 10, wherein the at least one processor is further configured to select or reselect a cell among a plurality of cells for the first frequency, and perform, via the transceiver, the NR sidelink communication based on the NR sidelink communication configuration and the V2X sidelink communication based on the V2X sidelink communication configuration, in the cell.

13. The terminal of claim 10, wherein the at least one processor is further configured to select or reselect a cell among a plurality of cells for the second frequency, and perform, via the transceiver, the NR sidelink communication based on the NR sidelink communication configuration and the V2X sidelink communication based on a preconfiguration in the cell, in case that the second frequency provides the NR sidelink communication configuration.

14. The terminal of claim 10, wherein the at least one processor is further configured to select or reselect a cell among a plurality of cells for the second frequency and perform, via the transceiver, the V2X sidelink communication based on the V2X sidelink communication configuration and the NR sidelink communication based on a preconfiguration in the cell, in case that the second frequency provides the V2X sidelink communication configuration.

15. The terminal of claim 10, wherein the V2X sidelink communication uses an evolved-universal mobile telecommunications system (UMTS) terrestrial radio access (E-UTRA) technology.

16. The terminal of claim 10, wherein the at least one processor is further configured to reselect a cell of the first frequency or the second frequency, in a case that the terminal is in a state of camping on another cell.

17. The terminal of claim 16, wherein the at least one processor is further configured to:
perform a transition to an RRC idle state, in case that a radio access technology (RAT) used by the cell is different from a RAT used by the another cell.

18. The terminal of claim 10, wherein the NR sidelink communication configuration and the V2X sidelink communication configuration are configured by an upper layer of an access stratum (AS) layer.

* * * * *